United States Patent [19]

Skinner

[11] Patent Number: 4,625,295
[45] Date of Patent: Nov. 25, 1986

[54] TEXTUAL COMPARISON SYSTEM FOR LOCATING DESIRED CHARACTER STRINGS AND DELIMITER CHARACTERS

[76] Inventor: James T. Skinner, 780 Yale Rd., Boulder, Colo. 80303

[21] Appl. No.: 456,989

[22] Filed: Jan. 12, 1983

Related U.S. Application Data

[63] Continuation-in-part of Ser. No. 342,620, Jan. 25, 1982, Pat. No. 4,531,201.

[51] Int. Cl.$^4$ .............................................. G06F 7/04
[52] U.S. Cl. ................................................... 364/900
[58] Field of Search ... 364/200 MS File, 900 MS File; 358/256; 178/22.03, 22.13

[56] References Cited

U.S. PATENT DOCUMENTS

| Re. 26,919 | 7/1970 | Hagelbarger | 364/900 |
|---|---|---|---|
| 3,670,104 | 6/1972 | Abrahamsen | 178/22.03 |
| 3,949,159 | 4/1976 | Ricards et al. | 358/256 |
| 4,057,849 | 11/1977 | Ying et al. | 364/200 |
| 4,095,277 | 6/1978 | Bluethman et al. | 364/900 |
| 4,152,762 | 5/1979 | Bird et al. | 364/200 |
| 4,202,041 | 5/1980 | Kaplow et al. | 364/900 |
| 4,242,735 | 12/1980 | Sexton | 364/900 |

OTHER PUBLICATIONS

"National Semiconductor TTL Data Book", National Semiconductor Corporation, 1976.
"Signetics TTL Logic Data Manual, 1982", Signetics, 1982.
"Signetics Low Power Schottky Pocket Guide", Signetics, 1978.

*Primary Examiner*—Harvey E. Springborn
*Attorney, Agent, or Firm*—Steven F. Caserza; Alan H. MacPherson; Kenneth E. Leeds

[57] ABSTRACT

A text comparator receives data stored in a mass storage device. The text comparator includes word logic, delimiter logic, set logic, set combination logic, proximity logic, and programming logic. The delimiter logic serves to monitor the characters transferred from the mass storage device and provides discrete signals depicting whether the character being transferred is a predefined delimiter character. The word logic serves to store data regarding predefined words (i.e., strings of characters) which are to be located and provides output word signals indicating when such predefined words have been located. The set logic receives the delimiter signals and word signals and provides output signals when selected words are located in the same sentence, same paragraph, etc., as desired. The set combination logic serves to combine the signals from the set logic in order to generate output signals in response to more complex search strategies than can be easily detected by the set logic. The proximity logic provides output signals indicating when predefined words detected by word logic or predefined set of words, as detected by set logic or a combination of this information, occurs within a predefined proximity. For example, proximity logic will determine if a first selected word occurs within N (where N is a selected integer) words of a second preselected word. The programming logic serves to receive search strategy instructions from the user and in response thereto provide the proper timing, addressing, and data signals the word logic, delimiter logic, set logic, set combination logic, and proximity logic to cause to be stored within these elements the information required to perform the desired search strategy.

11 Claims, 38 Drawing Figures

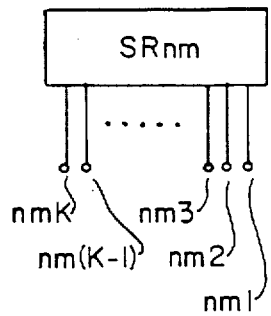
FIG. 4
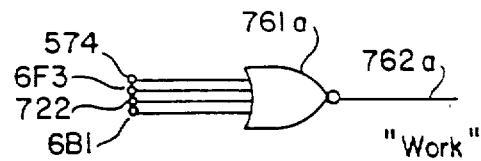
FIG. 5a
FIG. 3
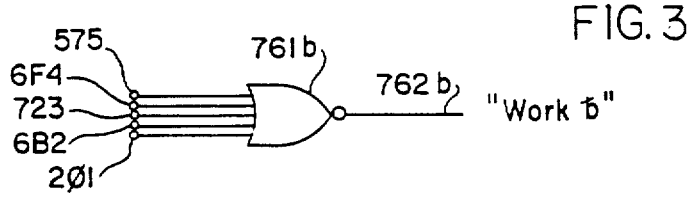
FIG. 5b
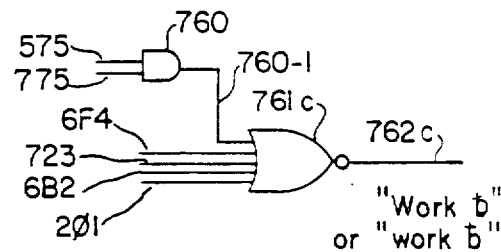
FIG. 5c
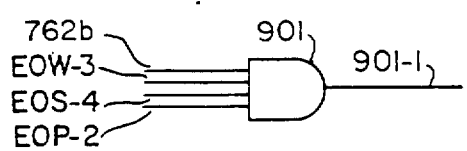
FIG. 5d
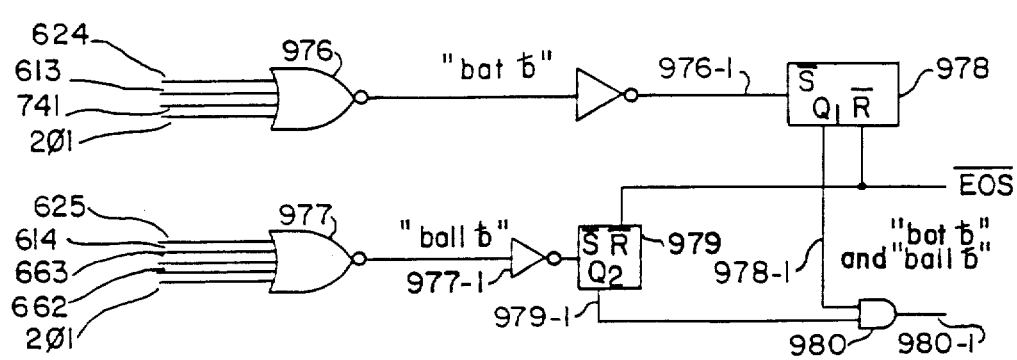
FIG. 5e

TEXTUAL COMPARISON SYSTEM FOR LOCATING DESIRED CHARACTER STRINGS AND DELIMITER CHARACTERS

RELATED APPLICATIONS

This application is a continuation-in-part of U.S. patent appliction Ser. No. 06/342,620 filed Jan. 25, 1982, now U.S. Pat. No. 4,531,201 issued 7-23-85.

BACKGROUND OF THE INVENTION

1. Field of the Invention

This invention relates to a structure and method for searching computer data bases in order to locate and retrieve textual information.

2. Description of the Prior Art

Prior art text comparators for searching a computer data base are known. Structures for carrying out such techniques (such structures are herein called "textual comparison systems") are used, for example, by Lockheed Dialog Information Retrieval Service, the United States Government "Flite" service, "Lexis", and others.

Such prior art textual comparison systems are software oriented in that a portion of the information stored in the computer (called a "data base") must be loaded into the computer working memory from a mass memory storage device (typically a magnetic disk). The portion of the data base within the working memory of the computer is scanned by the computer, as controlled by software instructions, in order to determine if any portion of the data base stored in the computer working memory matches the desired text. Typically the textual material comprising the data base is stored by using a set of standard data base characters such as the well-known and commonly used American National Standard Code for Information Interchange ("ASCII"). The ASCII characters and their binary and hexidecimal representations are shown in Table 1. Thus, such prior art software-oriented text comparators are rather slow in that the computer must control the transfer of sequential portions of the data base from a large storage media, such as a disk, to the computer memory, and the computer must then utilize an iterative process in order to determine whether the desired text is contained within that portion of the data base which has been transferred to the computer memory. Because the computer itself is performing the search, such prior art searching techniques are rather slow, and consequently expensive due to the large amount of computer time required to perform a search.

Another prior art comparator system is described in U.S. Pat. No. 4,152,762 issued May 1, 1979 to Bird et al. Bird et al describe a method and structure for text comparison which is rather complex and requires each desired textual word or phrase to be stored in octal format in one of a plurality of "key memories". In addition, the Bird structure requires the use of additional memories, including a "pointer memory" and a "hash memory", as well as a wide variety of other subcircuits. Thus, the Bird structure is rather complex.

SUMMARY

The present invention attacks the problem of text comparison for the purpose of retrieving textual information from a large data base system from a different point of view. In accordance with one embodiment of this invention, information stored in a mass memory unit, such as a magnetic disk, as a plurality of bytes, each byte representing a character, is input to a text comparison subcircuit which includes a decoder means, decoded data memory, and one or more logical operator sections. Each byte of information received from the disk is input to the decoder and is immediately decoded, and a signal corresponding to the character corresponding to the byte input to the decoder is generated. The system is capable of handling up to P different characters, where P is a selected positive integer.

The decoded data memory serves to store information received from the decoder pertaining to characters represented by the bytes of information received from the disk. The decoded data memory contains a plurality of p serial in-parallel out shift registers one shift register being uniquely assocaited with each one of the plurality of P different characters forming the data base stored in the storage device. Corresponding to the pth character (where p is an integer given by $1 \leq p \leq P$) and contained within the decoded data memory is a pth shift register uniquely arranged to receive the signal from the decoder representing the pth character. Upon receipt of a byte from the disk corresponding to a specific character, a first signal (e.g. a binary zero) is applied to the serial input lead of the shift register uniquely associated with the character by the decoder decoded, and a second signal (e.g. a binary one) is applied to the serial input lead of all shift registers associated with all other characters. A clock signal is applied to each shift register of the decoded data memory, thus shifting the data on the input lead of each shift register into the least significant bit of the shift register, and shifting each bit previously stored in a shift register to the next most significant bit position within the shift register. In this manner, the decoded data memory will provide signals on the output leads of each shift register indicative of the most recently received character, as well as each of the preceding (K−1) characters (i.e. a "character string" comprising K characters) received from the mass memory unit and decoded, where K is the number of bits contained in each shift register of the decoded data memory. Thus, each bit stored within a shift register will be a binary one except for the binary zero bits stored within a shift register corresponding to the location within the K bit character string of a character corresponding to the shift register. Of importance, only a single shift register within the decoded data memory will store a binary zero bit corresponding to each of the K positions within the K bit character string. By examining the bits stored within each shift register of the decoded data memory, the characters comprising the K bit character string, and their relative position within the character string is determined.

The output leads of the shift registers, which provide signals defining the relative location of characters recently received from the mass storage device and decoded by the decoder, are connected to the input leads of one or more logical operator sections which include a number of logical gates, such as AND gates and NOR gates, in order to provide an output signal indicating that a desired textual phrase has been located in the mass storage device.

In addition, the logical operator sections include word counters, paragraph counters, and other devices are employed as desired to provide special text comparison functions. The text comparison sub-circuit, the decoded data memory, and the logical operator sections of this invention are capable of operating at very high speeds, equal to the data output speed of the mass memory unit, thus providing a very high speed textual comparison operation.

A second embodiment of a text comparator constructed in accordance with this invention receives data stored in a mass storage device. This embodiment includes word logic, delimiter logic, set logic, set combination logic, proximity logic, and programming logic. The delimiter logic serves to monitor the characters transferred from the mass storage device and provides a signal depicting whether the character being transferred is a predefined delimiter character and, if so, the type of delimiter character. The word logic serves to store data regarding predefined words (i.e., strings of characters) which are to be located and provides output signals indicating when such predefined words have been located. The set logic receives the delimiter signals and word signals and provides output signals when selected words are located in the same sentence, same paragraph, etc., as desired. The set combination logic serves to combine the signals from the set logic in order to generate output signals in response to more complex search strategies than can be easily detected by the set logic. The proximity logic provides output signals indicating when predefined words detected by the word logic, or predefined set of words, as detected by the set logic, or a combination of this information, occurs within a predefined proximity. For example, the proximity logic will determine if a first selected word occurs within N (where N is a selected integer) words of a second preselected word.

BRIEF DESCRIPTION OF THE DRAWINGS

FIG. 3 is a diagram showing the interrelation of FIGS. 3a and 3b;

FIG. 4 is a diagram of one shift register of the decoded data memory of FIG. 3;

FIGS. 5a through 5e are diagrams of specific embodiments of the logical operator section of this invention;

DETAILED DESCRIPTION

The following specification recites certain standard, well-known, and generally available TTL components. These TTL components are available from a number of suppliers, including but not limited to those listed in the specification, and as will be appreciated by those of oridnary skill in the art, these specified components can be used in accordace with the teachings of this invention, regardless of the supplier. For further reference, the Applicant cites the "National Semiconductor TTL Data Book", National Semiconductor Corporation, 1976, the "Signetics TTL Logic Data Manual, 1982", Signetics, 1982, and the "Signetics Low Power Schottky Pocket Guide", Signetics, 1978.

FIRST EMBODIMENT

System Overview

Figure 1:
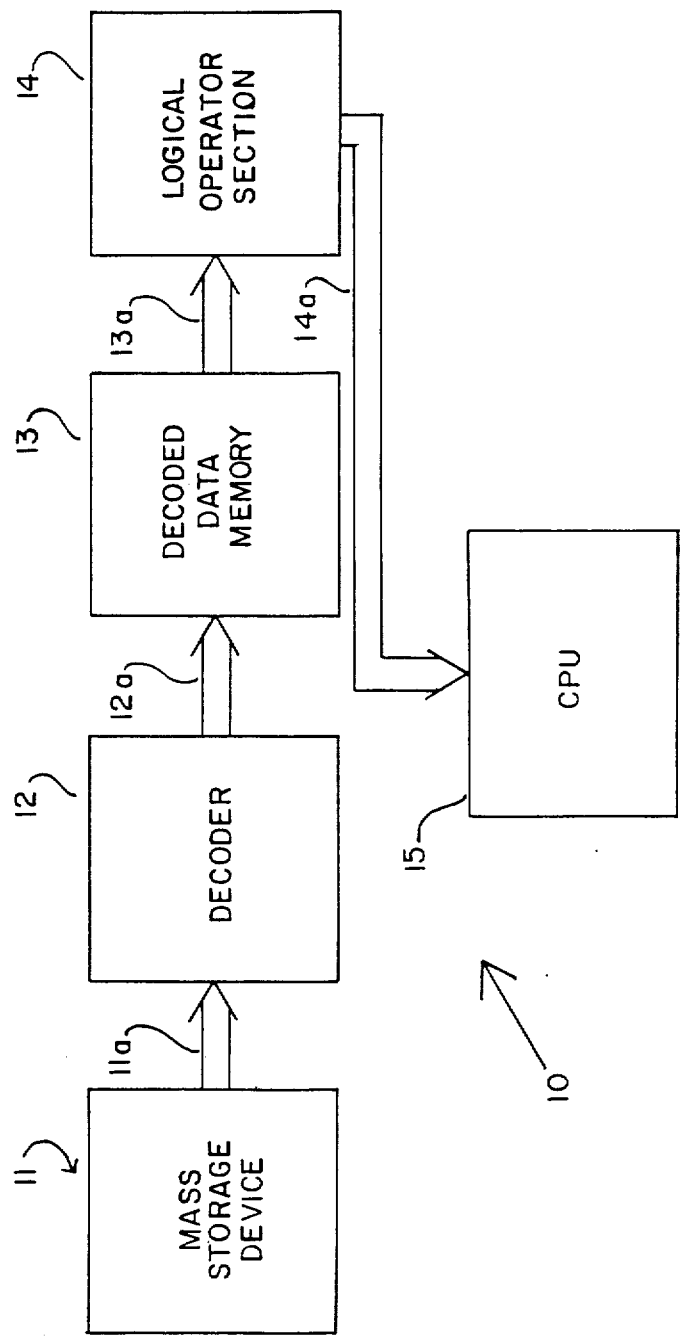
FIG. 1 is a block diagram of a textual comparison system constructed in accordance with this invention.

FIG. 1 shows a block diagram of a text comparator constructed in accordance with the first embodiment of this invention. Mass storage device 11 comprises a device suitable for the storage of a large quantity of data. Such data is typically called a "data base". The data base might be, for example, textual material such as United States patents, judicial decisions from various courts, or other information. Mass storage device 11 typically comprises a magnetic disk, as is well known in the computer arts, and the data base stored within mass storage device 11 is typically stored in ASCII format, although this invention can be utilized in conjunction with data bases stored in other than ASCII format (for example, EBCDIC).

Data stored in mass storage device 11 is transferred via bus 11a to decoder 12. Typically, bus 11a comprises a plurality of electrical leads, in order that a plurality of bits forming a single byte of information may be transferred simultaneously from mass storage device 11 to decoder 12. The simultaneous transfer of a plurality of bits forming a single byte is often referred to as "parallel data output".

Decoder 12 receives each byte transferred from mass storage device 11, and decodes that byte into one of a plurality of unique decoded data signals. Each such decoded data signal represents a unique one of the characters which form the data base stored in mass storage device 11. For example, such characters typically comprise the numbers zero through nine, twenty-six capital letters, twenty-six lower case letters, and a variety of punctuation and special symbols such as asterisk, period, comma, question mark, space, and the like. Inasmuch as ASCII is one widely used method of coding such characters into a plurality of bytes, this specification will refer to ASCII coding in order to explain the operation of one embodiment of this invention. However, it is to be understood that this invention is equally useful in systems wherein coding schemes other than ASCII is utilized. A cross reference table listing each character and its ASCII equivalent is given in Table 1.

The output from decoder 12 is connected via bus 12a to decoded data memory 13. Because ASCII comprises a plurality of 96 characters, bus 12a in the preferred embodiment comprises a plurality of 96 leads, one such lead being associated with a unique one of the ASCII characters. However, it should be understood that as many leads as required can be used depending on the number of characters to be decoded and in general bus 12a comprises a plurality of M leads, where M is a selected positive integer representing the number of characters to be decoded.

Decoded data memory 13 stores the decoded data provided by decoder 12 for a sequence of K characters stored in mass storage device 11 where K is a positive integer which is fixed by the particular design of the decoded data memory 13. Typically K will be either eight or sixteen, although K may be any positive integer. Decoded memory 13 comprises a plurality of 96 shift registers, one shift register for each ASCII character. K is equal to the number of bits which are stored within each shift register. The data (i.e., a logical one or a logical zero) contained in each of the K bits of the 96 shift registers of decoded data memory 13 indicates which ASCII characters form each character of the K byte character string ending in the most recently decoded character.

An output bus 13a, containing a number of leads equal to K96 (K96 equals K multiplied by 96), connects each of the K96 output leads of the 96 shift registers of decoded data memory 13 to logical operator section 14. Logical operator section 14 comprises one or more logical gates which perform a logical operation on the data stored in the shift registers of decoded data memory 13. This logical operation provides an output signal indicating when a desired textual phrase, string of characters, or sets of strings of characters, has been located within the data base stored in mass storage device 11. This output signal from logical operator section 14 is applied via bus 14a to central processing unit (CPU) 15. Thus, central processing unit 15 is made aware that a desired textual phrase has been located in mass storage device 11. CPU 15 then follows its set of programmed instructions, and utilizes the desired textual phrase which has been located in the data base. Typically, CPU 15 stores the address location of the beginning of the desired textual phrase which has been located in the data base, stores the record number of the record (i.e., patent number, etc.) in which the desired textual phrase has been found, or performs other desired tasks in response to the location and identification of the desired textual phrase within the data base. It is to be understood that, once the desired textual phrase has been located within the data base stored in mass storage device 11, and the CPU signalled by logical operator section 14, the operation of CPU 15 is generally the same as the operation of central processing units in systems utilizing prior art text comparison techniques.

Decoder 12

Figure 2:
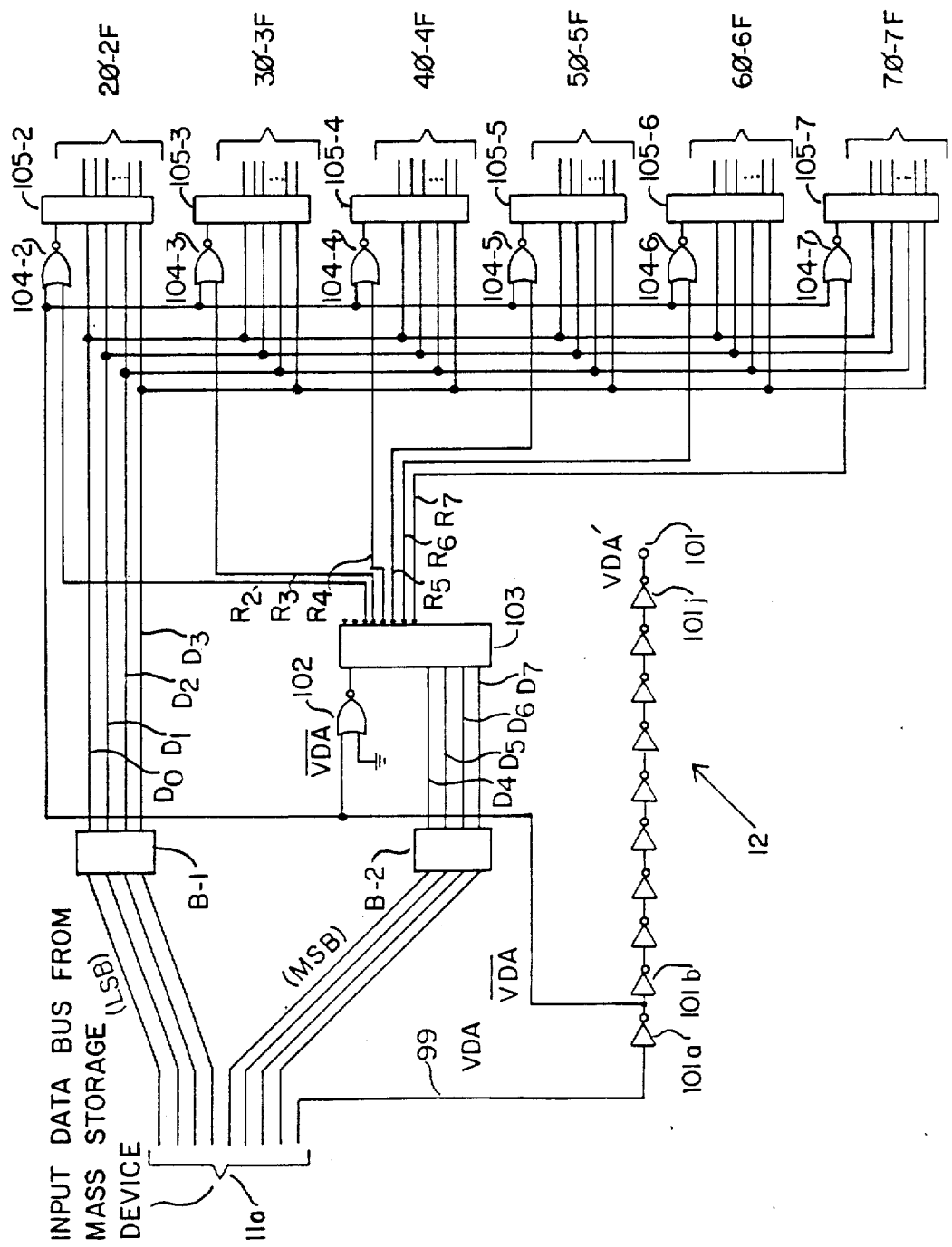
FIG. 2 is a diagram of a decoder means utilized in accordance with this invention.

Referring to FIG. 2, the detailed operation of decoder 12 will now be explained. The embodiment of decoder 12 shown in FIG. 2 is designed for use with systems utilizing ASCII coding. For systems utilizing other than ASCII coding, the specific design of decoder 12 differs from that shown in FIG. 2, but is easily provided by one of ordinary skill in the art, in light of the teachings of this specification. In ASCII format, as shown in Table 1, each character comprises eight binary digits (bits) or two hexidecimal digits. Input bus 11a comprises eight leads, thus providing to decoder 12 in a parallel output format the 8 bits forming a single ASCII character stored in mass storage device 11 (FIG. 1). Input bus 11a also comprises an additional lead 99, which provides a valid data signal (VDA) which, when high (logical "1") indicates that valid data is available on bus 11a from mass storage device 11. The four least significant bits (LSB) of the ASCII byte received from bus 11a are applied to four bit buffer B-1, thus providing on leads $D_0$ through $D_3$ buffered signals representing the four least significant bits of the ASCII byte. Similarly, the four most significant bits (MSB) of the ASCII byte received on bus 11a are applied to four bit buffer B-2, thus providing on leads D-7 through D-4 buffered signals representing the four most significant bits of the ASCII byte. Buffers B-1 and B-2 may comprise, for example, a 74125 device, such as manufactured and sold by Texas Instruments.

The buffered four least significant bits (on leads $D_0$ through $D_3$) are applied as input signals to demultiplexers 105-2 through 105-7 and the buffered four most significant bits (on leads D-7 through D-4) are applied as input signals to demultiplexer 103. Demultiplexers 103 and 105-2 through 105-7 are four bit to sixteen bit demultiplexers such as the 74LS154 manufactured and sold by Texas Instruments. Thus, each demultiplexer 103 and 105-2 through 105-7 provides a one of sixteen bit demultiplexing function, although only six of the sixteen output signals from demultiplexer 103 (on leads $R_2$ through $R_7$) are used because, as previously mentioned, ASCII comprises 96 characters, and these 96 characters are uniquely defined by the output leads of six separate four-to-sixteen bit demultiplexers 105-2 through 105-7, as will be more fully described below. Accordingly, as shown in Table 1, the four most significant bits of an ASCII byte range from a binary 0001 (a decimal 1) to a binary 0111 (a decimal 7).

The output signal on each output lead of demultiplexers 103 and 105-2 through 105-7 is normally high (logical one). Each demultiplexer has as many output leads (16) as there are different binary input signals (16) which can be applied to its four input leads. Each output lead corresponds uniquely to one possible input signal to the demultiplexer. However, when a four bit input signal (the four most significant bits on leads D-4 through D-7 connected to demultiplexer 103, or the four least significant bits on leads $D_0$ through $D_3$ applied to demultiplexers 105-2 through 105-7) is input to a demultiplexer, and that demultiplexer is enabled (to be more fully described below), a logical zero is placed on the output lead corresponding to the input signal applied to the demultiplexer. For example, if a four bit binary input signal 0101 is applied to a demultiplexer, and that demultiplexer is enabled, the output lead 5 (corresponding to a binary 0101) of the demultiplexer will be low, and all other output leads of the demultiplexer will be high. All output leads of a disabled demultiplexer are high.

Demultiplexers 103 and 105-2 through 105-7 are enabled by the application of a low signal to their respective enable terminals. This occurs only when valid data is present on bus 11a from the mass storage device. As previously described, a logical one on valid data lead 99 indicates that valid data is present on bus 11a. This logical one signal is inverted by inverter 101a and a logical zero $\overline{VDA}$ signal is applied to NOR gate 102 and NOR gates 104-2 through 104-7. Although NOR gates 102 and 104-2 through 104-7 are shown external to demultiplexers 103 and 105-2 through 105-7, these NOR gates are an integral part of the 74LS154 devices. The output lead of NOR gate 102 is connected to the enable input lead of demultiplexer 103, and the output leads of NOR gates 104-2 through 104-7 are connected to the enable input leads of demultiplexers 105-2 through 105-7, respectively. Thus, with a low VDA signal on lead 99, indicating that valid data is not present on input bus 11a, the $\overline{VDA}$ signal from the output lead of inverter 101a will be high, thus causing the output signal from NOR gates 102 (having its other input lead connected to ground) to be low, thus disabling demultiplexer 103. With demultiplexer 103 disabled, leads $R_2$ through $R_7$ will all be high; thus disabling demultiplexers 105-2 through 105-7.

On the other hand, with a logical high on VDA lead 99, indicating that valid data is present on input bus 9, the $\overline{VDA}$ signal will be low. Because one input lead of NOR gate 102 is connected to ground (logical zero) and the other input lead of NOR gate 102 is connected to $\overline{VDA}$, a low $\overline{VDA}$ signal causes the output signal from NOR gate 102 to go high, thus enabling demultiplexer 103. Demultiplexer 103 then demultiplexes the four most significant bits, thus providing a logical low on the unique output lead $R_2$ through $R_7$ corresponding to the value of the four most significant bits ($D_4$ through $D_7$). Output leads $R_2$ through $R_7$ of demultiplexer 103 are connected to one input lead of NOR gates 104-2 through 104-7, respectively, with the other input lead of NOR gates 104-2 through 104-7 being connected to $\overline{VDA}$. With a logical low $\overline{VDA}$ signal applied to one lead of NOR gates 104-2 through 104-7 and a logical low signal corresponding to the demultiplexed most significant bits of a unique one of leads $R_2$ through $R_7$ applied to the other lead of one of the NOR gates 104-2 through 104-7, a high signal will be generated on the output lead of the NOR gate 104-2 through 104-7 corresponding to the value of the most significant bits $D_4$ through $D_7$. Thus, upon receipt of valid data (high VDA signal) a selected one of demultiplexers 105-2 through 105-7 will be enabled, and all other demultiplexers 105-2 through 105-7 will be disabled by the logical high signal on the remaining leads $R_2$ through $R_6$. For example, with a high VDA signal, indicating receipt of valid data, and the four most significant bits equal to 0010, demultiplexer 103 is enabled and a low signal generated on lead $R_2$, with leads $R_3$ through $R_7$ remaining high. Demultiplexer 105-2 is enabled by the low $\overline{VDA}$ signal and the low signal on lead $R_2$. Demultiplexers 105-3 through 105-7 remain disabled by the high level signals on leads $R_3$ through $R_7$, respectively.

The output signals on each output lead of the disabled demultiplexers 105-2 through 105-7 will be high, as previously described. The signals on the output leads of the enabled one of demultiplexers 105-2 through 105-7 will be high, except for the single output lead which corresponds to the decoded least significant bits on leads $D_0$ through $D_3$ connected to the input leads of demultiplexers 105-2 through 105-7. In this manner, upon the receipt of valid data on bus 11a, a single low signal is generated on a single output lead of demultiplexers 105-2 through 105-7. The lead which contains that low signal corresponds to the character represented by the 8-bit ASCII byte received on bus 11a. For example, with a high VDA signal and an eight bit byte equal to 01101101 received on bus 11a, demultiplexer 103 will be enabled, as previously described, and the four most significant bits (0110) demultiplexed by demultiplexer 103, thereby generating a logical low signal on output lead $R_6$. This will enable demultiplexer 105-6, which in turn demultiplexes the four least significant bits (1101), thereby generating the signals on a logical low on output lead 6D of demultiplexer 105-6, with all other output leads of demultiplexer 105-6 remaining high. Output lead 6D corresponds to the ASCII character m, represented by 01101101. A high signal is present on leads $R_2$, $R_3$, $R_4$, $R_5$ and $R_7$, thus disabling demultiplexers 104-2, 104-3, 104-4, 104-5, and 104-7, thereby providing high signals on output leads 2∅ through 5F and 7∅ through 7F. For convenience, the output leads from demultiplexers 105-2 through 105-7 are numbered with two digits. The first digit indicates which of the six demultiplexers 105-2 through 105-7 is connected to the lead, and the second digit indicates the lead number (represented in hexadecimal as 0 through F). Utilizing this notation, the first digit also represents the four most significant bits of the data word received on bus 11a, and the second digit also represents the four least significant bits of the data word received on bus 11a.

Inverters 101a through 101j provide a time delayed VDA signal. By applying the valid data signal (VDA) on lead 99 to the input lead of inverter 101a a time delayed valid data signal (VDA') is generated by inverter 101j on node 101. The VDA' signal is delayed from the VDA signal by approximately 100 nanoseconds. The VDA' signal is used to enable the decoded data memory 13 (FIG. 1) to receive data from output leads 2∅ through 7F of decoder 12, but provides a time delay sufficient to allow the proper operation of decoder 12 prior to the receipt of decoded data by decoded data memory 13. Each inverter 101a through 101j may comprise, for example, one of the six inverters comprising a 7404 Hex inverter, such as is manufactured and sold by Texas Instruments.

Decoded Data Memory 13

Figure 3A:
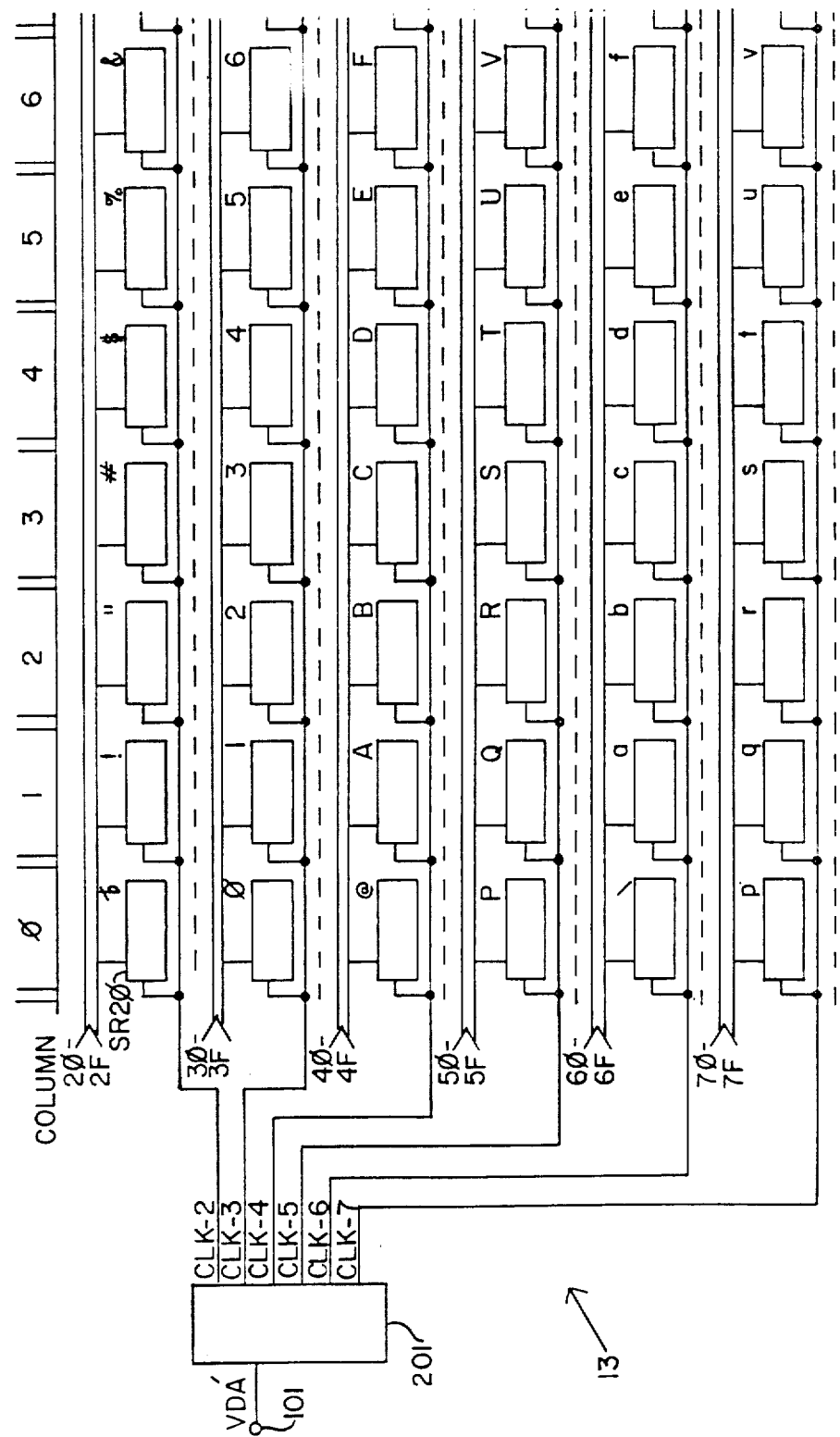
FIGS. 3a and 3b are diagrams of the decoded data memory constructed in accordance with this invention.
Figure 3B:
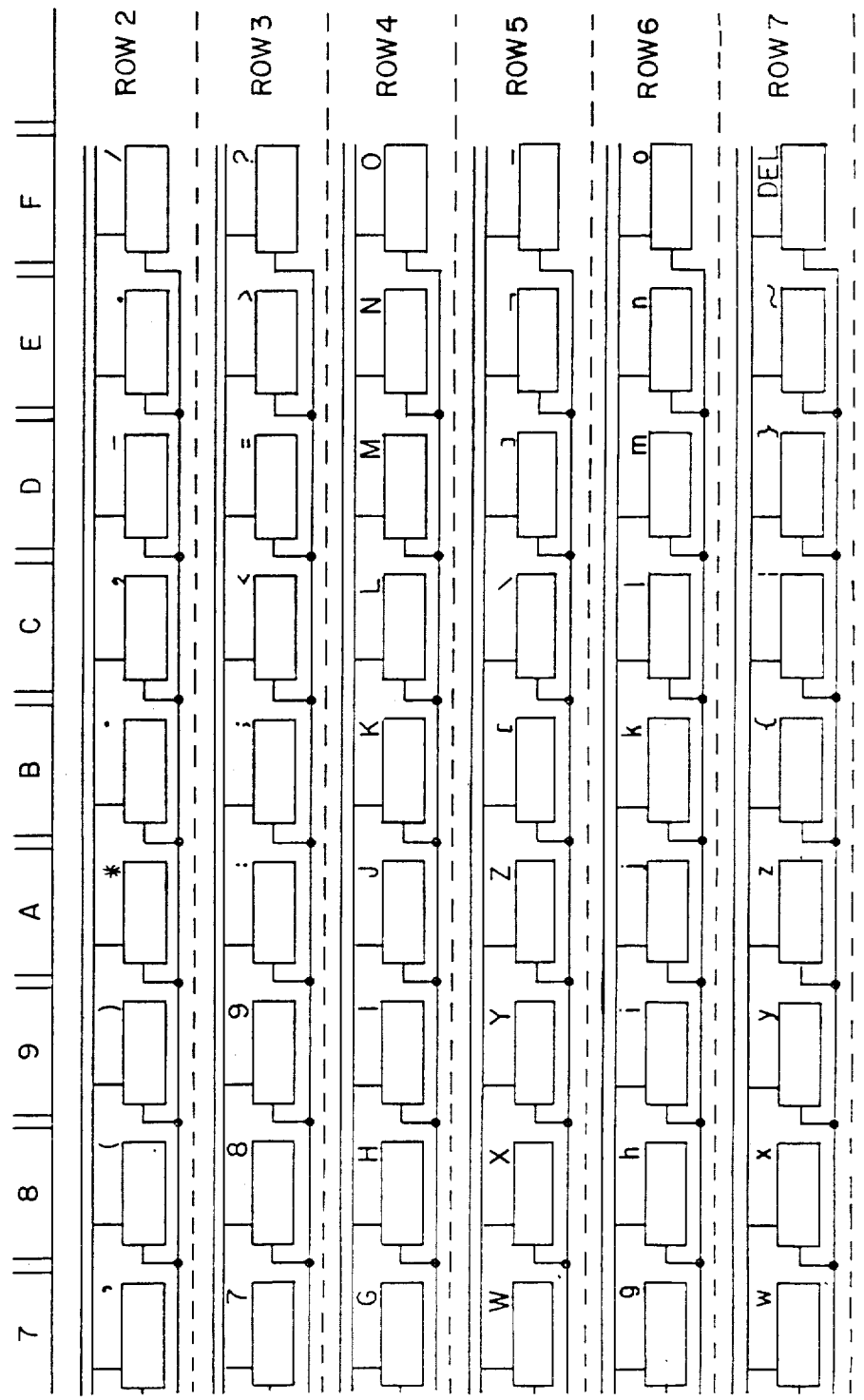

Referring to FIGS. 3a and 3b, the operation of decoded data memory 13 will now be explained. Upon the receipt of a high VDA' signal (corresponding to valid data on input bus 11a of decoder 12) on node 101 of decoded data memory 13, buffer 201 provides high clock signals CLK-2 through CLK-7. Buffer 201 may comprise, for example a 74365 device manufactured and sold by Signetics.

Decoded data memory 13 comprises a plurality of shift registers such as shift register SR2∅. For purposes of clarity, the plurality of 96 shift registers are not individually labelled; only shift register SR2∅ is so labelled. However, the array of shift registers of decoded data memory 13 of FIGS. 3a and 3b are arranged in a matrix comprising six rows (row 2 through row 7) and sixteen columns (column ∅ through column F). Thus, shift register SR2∅ is the shift register located at the intersection of row 2 and column ∅. In a similar manner, the shift register located at the intersection of row n and column m will be referred to as shift register SRnm in this specification.

Each shift register SRnm (where n and m are positive integers given by $1 \leq n \leq N$ and $1 \leq m \leq M$) is connected to a unique one nm of leads 2∅ through 7F which corresponds to that shift register. Thus, shift register SR2∅ is connected to lead 2∅ and shift register SRnm is connected to lead nm. Leads 2∅, nm and NM in turn connected to the decoder 12 of FIG. 2. In this fashion, each shift register of the decoded data memory 13 is connected to a unique output lead of decoder 12 (FIG. 2), thereby causing each shift register of decoded data memory 13 to correspond to a unique one of the 96

ASCII characters. For convenience, the ASCII character associated with each shift register is indicated above the shift register. Thus, shift register SR2∅, connected to lead 2∅, corresponds to a blank (b̄) which is coded in ASCII as a hexidecimal "2∅", as shown in Table 1. In a similar manner, each of the 96 shift registers of decoded data memory 13 corresponds to a unique ASCII character. As previously mentioned, each shift register SRnm is capable of storing K bits, thus allowing decoded data memory 13 to store K decoded characters and their relative position within the string of K characters.

Clock signals CLK-2 through CLK-7 are connected to each shift register within row 2 through row 7, respectively. Upon the receipt of a high VDA' signal, CLK-2 through CLK-7 go high. The low to high transition of clock signals CLK-2 through CLK-7 enables all shift registers of rows 2 through 7, respectively, of decoded data memory 13. Enabling each shift register causes the signal on the signal lead connected to that shift register to be stored in the least significant bit of the shift register, and all other data previously stored shifted to the next most significant bit. Thus, for example, if a logical zero is present on signal lead 2∅, and a high VDA' signal is received, CLK-2 will go high, thus causing the logical zero on lead 2∅ to be stored in the least significant bit of shift register SR2∅. All other data previously stored in shift register SR2∅ will be shifted to the next most significant bit, with the previously stored most significant bit being lost.

The plurality of shift registers comprising decoded data memory 13 may comprise, for example, eight bit serial in, parallel out shift registers, such as 74164 devices manufactured and sold by Signetics. Alternatively, each shift register SR2∅ through SR7F may comprise a plurality of 74164 devices serially connected in order to increase the number of bits which are stored within each of the 96 shift registers forming decoded memory 13.

Of importance, only a single logical zero will be present on signal leads 2∅-7F at any time. Thus, the unique one of the 96 shift registers which corresponds to the most recently decoded byte from mass storage device 11 will store a least significant bit equal to a logical zero, while all other shift registers will store a least significant bit equal to a logical one. Thus, for example, if a blank was the most recently decoded ASCII character, decoded data memory 13 will indicate this fact by the presence of a logical zero as the least significant bit of shift register 2∅, with the least significant bits of all other shift registers SRnm being equal to a logical one. In a similar fasion, the previously decoded character will be indicated by the presence of a logical zero as the next to least significant bit stored in the shift register corresponding to the previously decoded character. Thus, if an "!" was the previously decoded character, the next to least significant bit stored within shift register SR21 (corresponding to the exclamation point) will be a logical zero, and the next to least significant bit stored within all other shift registers will be a logical one. In this manner, each of the most recently decoded K characters are indicated by the location of logical zeros within the shift register of decoded data memory 13, where K is the number of bits stored in each shift register.

An example of the ability of decoded data memory 13 to store a character string which is decoded by decoder 12 (FIG. 1) will now be given. Initially all bits contained within each of the 96 shift registers of decoded data memory 13, comprise logical ones. This may be accomplished for example, by providing a low VDA signal, thus disabling demultiplexers 105-2 through 105-7 (FIG. 2), and thereby providing logical one signals on leads 2∅ through 7F, and providing a series of K low to high transitions on terminal 101, thus shifting a series of K logical one signals into each K bit shift register (SR2∅ through SR7F) of decoded data memory 13. These low to high transitions on terminal 101 are easily provided with well known circuitry (not shown).

If the word "Work" is to be decoded by decoder 12 the 8 bits corresponding to the hexadecimal ASCII code 57 for a "W" will be output mass storage device 11 to input bus 11a of decoder 12 (FIG. 2). A valid data signal (high VDA) will also be made available on bus 11a. Demultiplexer 103 will be enabled, and a logical low signal generated on lead $R_5$ corresponding to the most significant bits of the ASCII code for W. The logical low on lead $R_5$, and the low $\overline{VDA}$ signal will enable demultiplexer 105-5. Demultiplexer 105-5 then demultiplexes the least significant bits, and provides a logical low on output lead 57. All remaining output leads of demultiplexers 105-2 through 105-7 remain high at this time. The output signals on demultiplexers 105-2 through 105-7 are then (after the time delay provided by inverters 101a through 101j) shifted into the least significant bit positions of their corresponding shift registers of decoded data memory 13 (FIG. 3). Thus, the least significant bit of shift register SR57 will store a logical zero, and the least significant bits of all remaining shift registers will store a logical one. The shift register SR57 will store the bits 111∅, and all other shift registers will store the bits 1111, if shift registers SR20 through SR7F comprise four bit shift registers.

The letter "o" (hexadecimal 6F) is then output from mass storage device 11 to decoder 12 (FIG. 2). Demultiplexer 103 decodes the four most significant bits $D_4$ through $D_7$ and provides a logical low signal on output lead $R_6$. The low signal on lead $R_6$, together with the low $\overline{VDA}$ signal, enables demultiplexer 105-6. Demultiplexser 105-6 then decodes the four least significant bits $D_0$ through $D_3$ and provides a logical low signal on output lead 6F. All signals on all remaining output leads of demultiplexers 105-2 through 105-7 are logical ones at this time. The signals on the output leads of demultiplexers 105-2 through 105-7 are then shifted into the least significant bit of their associated shift registers of decoded data memory 13 (FIG. 3). At this time, shift register SR6F corresponding to the character "o" will store the bits 1110, indicating that a "o" has been the most recently decoded character. Similarly, shift register SR57 will store the bits 1101, indicating that the character "W" was the previously decoded character. All others shift registers of decoded data memory 13 will store the bits 1111 indicating that their associated characters are not one of the last four characters decoded.

The character "r" (hexadecimal 72) is now output from mass storage device 11 to decoder 12 (FIG. 2). Demultiplexer 103 decodes the most significant bits of the character "r", and provides a logical zero signal on output lead $R_7$. Demultiplexer 105-7 is thus enabled, and provides a logical zero signal on output lead 72, with the signals on all other output leads 2∅ through 7F being logical ones. The signals on the output leads of demultiplexers 105-2 through 105-7 are then shifted into decoder data memory 13 (FIG. 3). Shift register SR72 will store the bits 1110, shift register SR6F will store the bits 1101, shift register SR57 will store the bits 1011, and all remaining shift registers will store the bit 1111, indicating that the character string "Wor" has been decoded.

The ASCII character "k" (hexadecimal 6B) is then output from mass storage device 11 to decoder 12 (FIG. 2). Demultiplexer 103 decodes the most significant bits of the ASCII character, thus providing a logical zero signal on lead $R_6$. The logical zero signal on lead $R_6$ enables demultiplexer 105-6. Demultiplexer 105-6 demultiplexes the least significant bits of the ASCII character, thereby providing a logical zero signal on output lead 6B, with logical ones being present on all other output leads 2∅ through 7F. The data on the output leads of demultiplexer 105-2 through 105-7 is then shifted into decoded data memory 13 (FIG. 3a). At this time, shift register SR6B will store the bits 1110, shift register SR72 will store the bits 1101, shift register 6F will store the bits 1011, and shift register SR57 will store the bits 0111, indicating that the character string "Work" has been decoded.

TABLE 1

| Character | ASCII Code (Binary) | ASCII Code (Hexidecimal) | Character | ASCII Code (Binary) | ASCII Code (Hexidecimal) |
|---|---|---|---|---|---|
| blank | 00100000 | 2∅ | P | 01010000 | 5∅ |
| ! | 00100001 | 21 | Q | 01010001 | 51 |
| " | 00100010 | 22 | R | 01010010 | 52 |
| # | 00100011 | 23 | S | 01010011 | 53 |
| $ | 00100100 | 24 | T | 01010100 | 54 |
| % | 00100101 | 25 | U | 01010101 | 55 |
| & | 00100110 | 26 | V | 01010110 | 56 |
| ' | 00100111 | 27 | W | 01010111 | 57 |
| ( | 00101000 | 28 | X | 01011000 | 58 |
| ) | 00101001 | 29 | Y | 01011001 | 59 |
| * | 00101010 | 2A | Z | 01011010 | 5A |
| + | 00101011 | 2B | [ | 01011011 | 5B |
| , | 00101100 | 2C | \ | 01011100 | 5C |
| - | 00101101 | 2D | ] | 01011101 | 5D |
| . | 00101110 | 2E | ↑ or ∧ | 01011110 | 5E |
| / | 00101111 | 2F | — | 01011111 | 5F |
| ∅ | 00110000 | 3∅ | ` | 01100000 | 6∅ |
| 1 | 00110001 | 31 | a | 01100001 | 61 |
| 2 | 00110010 | 32 | b | 01100010 | 62 |
| 3 | 00110011 | 33 | c | 01100011 | 63 |
| 4 | 00110100 | 34 | d | 01100100 | 64 |
| 5 | 00110101 | 35 | e | 01100101 | 65 |
| 6 | 00110110 | 36 | f | 01100110 | 66 |
| 7 | 00110111 | 37 | g | 01100111 | 67 |
| 8 | 00111000 | 38 | h | 01101000 | 68 |
| 9 | 00111001 | 39 | i | 01101001 | 69 |
| : | 00111010 | 3A | j | 01101010 | 6A |
| ; | 00111011 | 3B | k | 01101011 | 6B |
| < | 00111100 | 3C | l | 01101100 | 6C |
| = | 00111101 | 3D | m | 01101101 | 6D |
| > | 00111110 | 3E | n | 01101110 | 6E |
| ? | 00111111 | 3F | o | 01101111 | 6F |
| @ | 01000000 | 4∅ | p | 01110000 | 7∅ |
| A | 01000001 | 41 | q | 01110001 | 71 |
| B | 01000010 | 42 | r | 01110010 | 72 |
| C | 01000011 | 43 | s | 01110011 | 73 |
| D | 01000100 | 44 | t | 01110100 | 74 |
| E | 01000101 | 45 | u | 01110101 | 75 |
| F | 01000110 | 46 | v | 01110110 | 76 |
| G | 01000111 | 47 | w | 01110111 | 77 |
| H | 01001000 | 48 | x | 01111000 | 78 |
| I | 01001001 | 49 | y | 01111001 | 79 |
| J | 01001010 | 4A | z | 01111010 | 7A |
| K | 01001011 | 4B | { | 01111011 | 7B |
| L | 01001100 | 4C | ( | 01111100 | 7C |
| M | 01001101 | 4D | } | 01111101 | 7D |
| N | 01001110 | 4E | ~ | 01111110 | 7E |
| O | 01001111 | 4F | DEL | 01111111 | 7F |

A detailed view of the output leads of the shift registers of decoded data memory 13 is shown in FIG. 4. Shift register SRnm, corresponding to the shift register at the intersection of row n and column m, has a plurality of K output leads for examining the K bits stored within shift register SRnm. Thus, the least significant bit stored within shift register SRnm is available on lead nm1, the next to the least significant bit is available on lead nm2, and the most significant bit is available on lead nmK.

Logical Operator Section 14

Logical operator section 14 comprises one or more logical gates which may be hard wired to decoded data memory 13, or alternatively programmably connected under computer control, as described later. One embodiment of logical operator section 14 (FIG. 1) is shown in FIG. 5a. Here, NOR gate 761a is connected so as to provide a logical one signal on output lead 762a when the character string "Work" has been located in mass storage device 11 (FIG. 1). When the character string "Work" has been received, the fourth least significant bit of shift register SR57 (as provided on lead 574), the third least significant bit of shift register SR6F (as provided on lead 6F3), the second least significant bit of shift register SR72 (as provided on lead 722), and the least significant bit of shift register SR6B (as provided on lead 6B1), will all be equal to logical zeros. Thus, upon receipt of the character string "Work", the output signal on lead 762a of NOR gate 761a (having its input leads connected to leads 574, 6F3, 722 and 6B1) will be a logical one, in contrast to the logical low signal present on lead 762a at all other times.

Because the character string "Work" will be detected by NOR gate 761a upon decoding of the first four letters of the word "Working" as well as for the word "Work", when seeking to locate a character string equivalent to the word "Work", and not any variations thereof, the logical operator section 14 (FIG. 1) is programmed to locate the character string "Work$\overline{b}$" (where $\overline{b}$ is a blank character). This is depicted in FIG. 5b, where NOR gate 761b requires the fifth least significant bit of shift register SR57 (on lead 575), the fourth least significant bit of shift register SR6F (on lead 6F4), the third least significant bit of shift register SR72 (on lead 723), the second least significant bit of shift register SR6B (on lead 6B2), and the least significant bit of shift register SR2∅ (on lead 2∅1) to all be logical zeros in order for the signal on lead 762a to be a logical one, indicating receipt of the character string "Work$\overline{b}$".

By the appropriate connection of additional gates, logical operator section 14 may perform other search functions. For example, if it is desired to locate within mass storage device 11 all occurrences of either the word "Work$\overline{b}$" or "work$\overline{b}$", the circuit of FIG. 5c will serve as logical operator section 14. Here, the input leads of AND gate 760 are connected to leads 575 (from shift register 57 corresponding to the capital letter "W") and 775 (from shift register 77 corresponding to the lower case letter "w"). Thus, a logical low on either lead 575 or lead 775 will provide a logical low signal on lead 760-1, which in turn is connected to an input lead of NOR gate 761C. The remaining input leads of NOR gate 761C are connected to leads 6F4, 723, 6B2, and 1∅1, as in the embodiment of FIG. 5b. In this manner, a logical high output signal is provided on lead 762C when either of the desired words "Work$\overline{b}$" or "work$\overline{b}$" are located.

In many data base systems, additional symbols are used to indicate the end of a word (EOW), the end of a sentence (EOS), the end of a paragraph (EOP), and the end of a document (EOD). These additional symbols may comprise eight bit bytes which do not form one of the 96 ASCII characters (i.e. comprise ∅∅ through ∅F or 8∅ through 8F). Alternatively, these additional symbols may comprise one or more ASCII characters. For example, the end of sentence signal (EOS) may comprise a period followed by two blanks. Additional shift registers are utilized to serve as word counters, sentence counters, and paragraph counters.

Figure 6A:
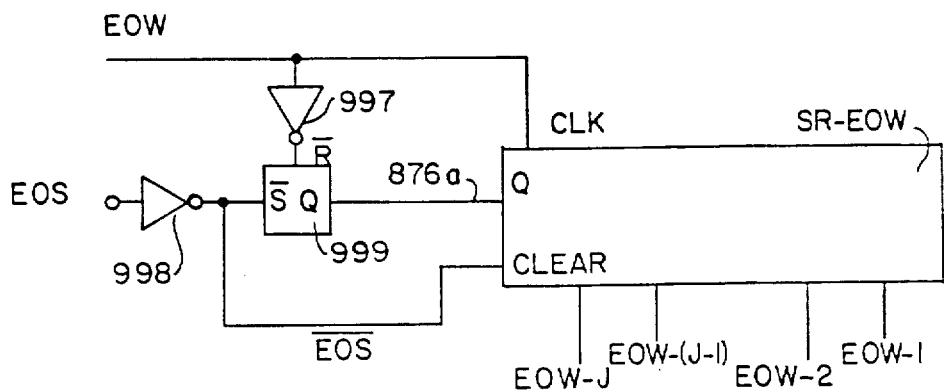
FIG. 6a is a diagram of one embodiment of a word counter of this invention.

An example of a word counter, which indicates which word within a sentence is being decoded is shown in FIG. 6a. Shift register SR-EOW may comprise a 74164 8-bit serial-in, parallel-out shift register, as has been previously described for the shift registers of decoded data memory 13. Alternatively, a plurality of 8-bit shift registers may be connected serially, thus providing shift register SR-EOW which is capable of storing greater than 8 bits. As shown in FIG. 6a, shift register SR-EOW is provided a clock signal by the end of word (EOW) signal. Thus, shift register SR-EOW is clocked upon receipt of an EOW signal, thereby shifting data on input lead 876a into shift register SR-EOW and shifting data stored in the shift register to the next most significant bit. Input lead 876a is connected to the output lead of SR flip flop 999 (which may comprise a 74LS279 device manufactured by Signetics). On receipt of a high EOS signal indicating the end of a sentence, a logical low $\overline{EOS}$ signal is generated by inverter 998 (e.g. a 7404 device) and applied to the clear input lead of shift register SR-EOW, thus clearing shift register SR-EOW (i.e. shift register SR-EOW stores all zeroes when clear). This low $\overline{EOS}$ signal also causes flip flop 999 to provide a high output signal on lead 876a. Upon the receipt a high EOW signal, indicating the end of a word, the high output signal on lead 876a is clocked into the least significant bit of shift register SR-EOW. Also, upon receipt of a high EOW signal, inverter 997 provides a low $\overline{R}$ signal to reset flip flop 999, thus causing flip flop 999 to provide a low output signal. This low output signal is input to shift register SR-EOW by the operation of subsequent EOW signals applied to the clock input lead of shift register SR-EOW, thereby shifting the low Q signal on the output lead of flip flop 999 into the least significant bit of shift register SR-EOW, and shifting the data stored in each bit of shift register SR-EOW to the next significant bit. Thus, the signal initially stored within the least significant bit of shift register SR-EOW in response to a high EOS signal is shifted to the left (i.e. the next most significant bit) upon receipt of each EOW signal. In this manner, the signal on leads EOW-1 through EOW-j, where j is the number of bits stored within shift register SR-EOW, indicate which word within the sentence is being decoded. Thus, for example, if a logical one is present on lead EOW-1, the first word in the sentence is being decoded. Similarly, where a logical one is present on lead EOW-2, the second word of the sentence is being decoded. Of importance, only a single logical one will be present on leads EOW-1 through EOW-j. This is accomplished by applying a high signal to the "clear" input lead of shift register SR-EOW upon receipt of a high EOS signal, thus resetting all bits stored in shift register SR-EOW to logical zeros immediately prior to the storage of a logical one in the least significant bit of shift register SR-EOW when a high EOS (End of Sentence) signal is applied to input lead 876a.

Figure 6B:
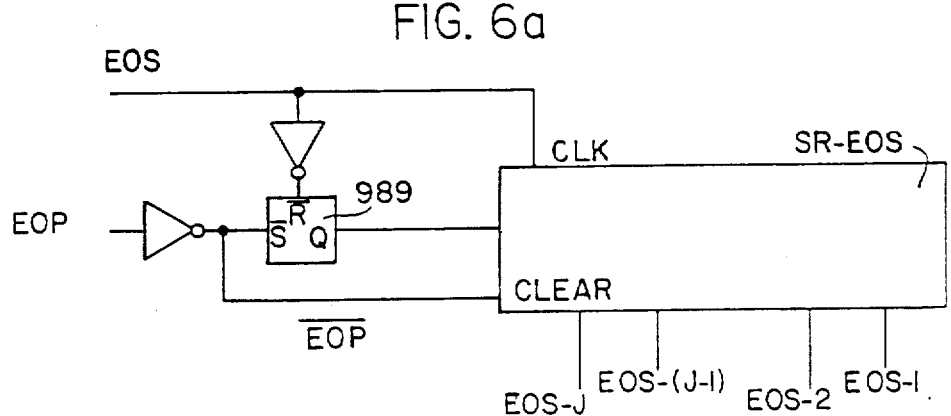
FIG. 6b is a diagram of one embodiment of a sentence counter of this invention.

A sentence counter is shown in FIG. 6b. The sentence counter, comprising shift register SR-EOS having output leads EOS-1 through EOS-j, operates in a similar manner as the word counter of FIG. 6a. However, flip flop 989 has its input lead connected to the EOP (End of Paragraph) signal, thereby clearing shift register SR-EOS and setting flip flop 989 high upon receipt of each EOP signal. Upon the receipt of a high EOS signal, shift register SR-EOS is clocked in a similar manner as SR-EOW (FIG. 6a), thereby storing a logical one in the least significant bit of shift register SR-EOS upon receipt of the first sentence of each paragraph, and clocking this logical one to the next significant bit upon receipt of each sentence. Thus, the presence of a logical one on a unique one of leads of EOS-1 through EOS-j indicates which sentence in a paragraph is being decoded.

Figure 6C:
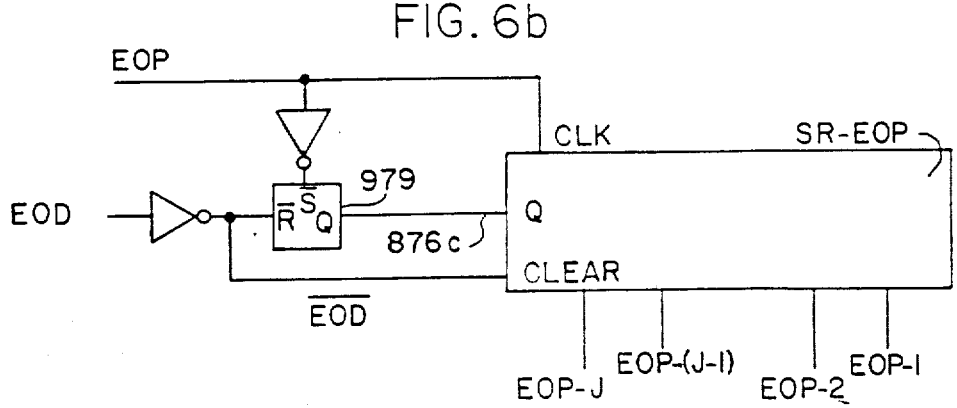
FIG. 6c is a diagram of one embodiment of a paragraph counter of this invention.

A paragraph counter is shown in FIG. 6c. The paragraph counter, comprising shift register SR-EOP having output leads EOP-1 through EOP-j, operates in a similar manner as the word counter of FIG. 6a and the sentence counter of FIG. 6b. However, the EOP signal provides a clock signal to the paragraph counter SR-EOP. The input lead 876c of the paragraph counter is connected to the output lead of RS flip flop 979, which is set by the EOD (End of Document) signal. The clear input lead is activated upon receipt of a high EOD signal. In this manner, the logical one appearing on a unique one of output leads EOP-1 through EOP-j indicates which paragraph within the document is being decoded.

Utilizing the word counter, sentence counter, paragraph counter, and decoded data memory 13, complex full-text searching may be accomplished. For example, if it is desired to locate a document stored within mass storage device 11 in which the word "Workb̄" appears in the third word of the fourth sentence of the second paragraph, the circuit of FIG. 5d is used. The circuit of FIG. 5d comprises AND gate 901 having one input lead connected to output lead 762b of the circuit of FIG. 5b. Thus, a logical high signal will be input to AND gate 901 on lead 762b when the character string "Workb̄" is decoded. Similarly, a logical high signal will be input to AND gate 901 when the third least significant bit of the word counter is a logical one, indicating that the third word is being decoded. This high signal will be available on lead EOW-3. In a similar manner, when the fourth sentence of the paragraph is being decoded, a logical high will be applied at an input signal to AND gate 901 on lead EOS-4, and when the second paragraph of a document is being decoded, a high input signal will be applied to AND gate 901 on lead EOP-2. Thus, a logical high signal will be present on output lead 901-1 only when the word "Workb̄" is decoded as the third word of the fourth sentence of the second paragraph of a document.

In accordance with this invention, full text searching is accomplished to locate documents in which a plurality of desired words occur within the same sentence. For example, one embodiment of a logical operator section 14 which may be utilized to locate text which includes the word "batb̄" and "ballb̄" in the same sentence is shown in FIG. 5e. NOR gate 976 has its input leads connected to leads 624, 613, 741 and 2∅1 of decoded data memory 13, thus providing a logical high output signal on lead 976-1 when the word "batb̄" has been decoded. Similarly, NOR gate 977 has its input leads connected to leads 625, 614, 663, 662 and 201 of decoded data memory 13, thus providing a logical high on output lead 977-1 when the word "ball$\bar{b}$" is decoded. Lead 976-1 is connected to the $\bar{S}$ input of SR flip-flop 978, thus providing a logical high on the $Q_1$ output lead 978-1 when the word "bat$\bar{b}$" has been decoded. Similarly, lead 977-1 is connected to the $\bar{S}$ input lead of SR flip-flop 979, thus providing a high signal on the $Q_2$ output lead 979-1 when the word "ball$\bar{b}$" has been decoded. Flip-flops 978 and 979 are reset by a low $\overline{EOS}$ signal, which is applied to the $\bar{R}$ input leads of the flip-flops. Thus, at the end of each sentence, flip-flops 978 and 979 are reset ($Q_1$ and $Q_2$ reset to logical zero), thus indicating that the words "bat$\bar{b}$" and "ball$\bar{b}$" have not been decoded within the next sentence. The output leads 978-1 and 979-1 from the flip-flops are connected to the input of AND gate 980, thus providing a logical high on output lead 980-1 when the words "bat$\bar{b}$" and "ball$\bar{b}$" have been decoded within the same sentence (i.e. $Q_1$ output lead of flip flop 978 and $Q_2$ output lead of flip flop 979 both high). By utilizing the end of paragraph (EOP) or the end of document (EOD) signal in place of the end of sentence (EOS) signal in the logical operator section depicted in FIG. 5e, documents may be located in which the words "bat$\bar{b}$" and "ball$\bar{b}$" are located within the same paragraph, or document, respectively.

It is often desired to find the location within the data base where a first desired word appears within a selected number of words of a second desired word. For example, it may be desirable to locate instances where the word "ball" appears within four words of the word "bat", in order to locate portions of the data base referring to baseball, while not locating portions of the data base referring to any other type of ball (e.g. golf ball, etc.) and any other type of bat (e.g. flying mammals). One embodiment of logical operator section 14 which may accomplish this task of locating portions of the data base wherein the word "bat" appears within four words of the word "ball" is shown in the schematic diagrams of FIGS. 7a and 7b.

Figure 7A:
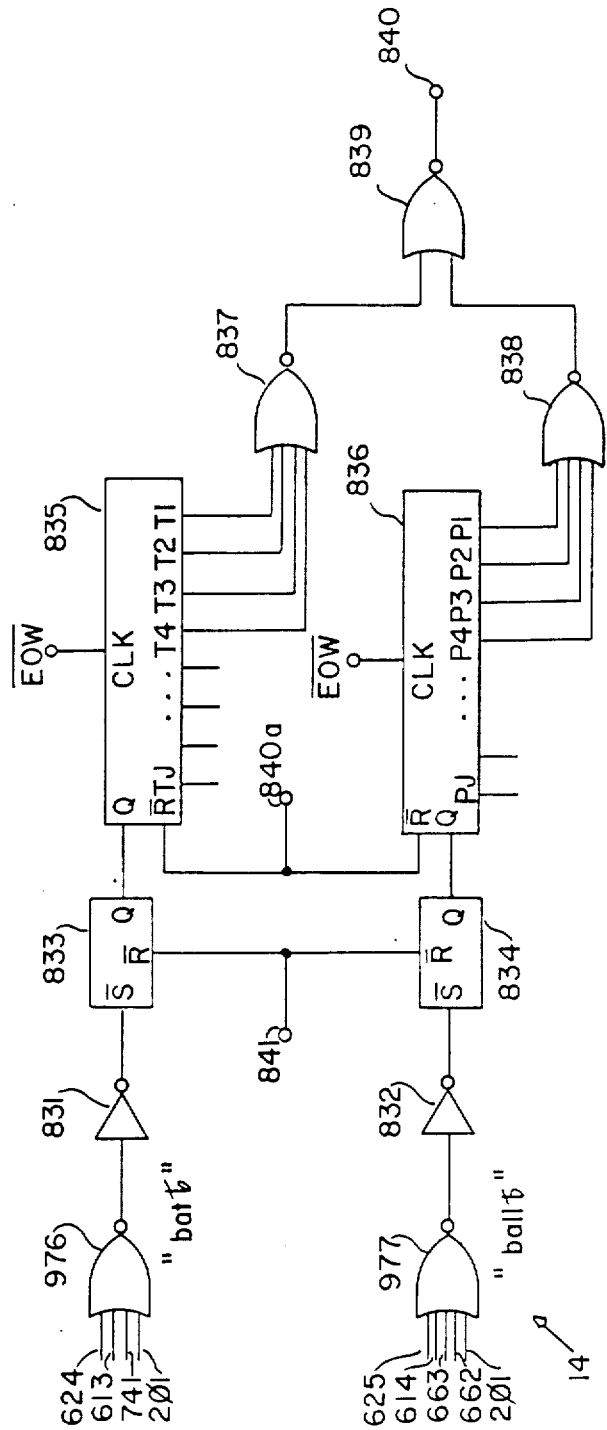
FIGS. 7a and 7b are diagrams of another embodiment of the logical operator section of this invention.

Logical operator section 14 of FIG. 7a includes NOR gate 976 and NOR gate 977, which are connected in the same manner as NOR gates 976 and 977, respectively, of FIG. 5e. Accordingly, a high output signal from NOR gate 976 indicates that the word "bat$\bar{b}$" has just been located. Similarly, a low output signal from NOR gate 977 indicates that the word "ball$\bar{b}$" has just been located. Inverters 831 and 832 invert the output signal from NOR gates 976 and 977, respectively. Thus, upon detection of the word "bat$\bar{b}$", the output signal from inverter 831 is low, thus setting SR flip flop 833 to have a high Q output signal. Similarly, upon detection of the word "ball$\bar{b}$", the output signal from inverter 832 is low, thus setting SR flip flop 834 such that its Q output signal is high. The Q output signals from SR flip flops 833 and 834 are clocked into the least significant bit of shift registers, 835 and 836, respectively, upon receipt of a low $\overline{EOW}$ signal which is applied to the clock input leads of shift registers 835 and 836. SR flip flops 833 and 834 are required in order to preserve the signal indicating that the desired words have been decoded, until the receipt of the $\overline{EOW}$ signal which clocks that data into shift registers 835 and 836, respectively. If SR flip flops 833 and 834 were not used, the signal indicating that the desired words had been detected would be lost prior to being clocked into shift registers 835 and 836, respectively. Of importance, when the $\overline{EOW}$ signal comprises a blank character (which appears at the end of every word), and the desired word being detected includes the blank character and, thus in this case, the end of the word (e.g. "bat$\bar{b}$" and "ball$\bar{b}$") shift registers 833 and 834 (and thus inverters 831 and 832) are not required, because the $\overline{EOW}$ signal appears simultaneously with the high output signal from either NOR gate 976 or NOR gate 977 indicating that the desired word has been decoded.

Upon detection of the word "bat$\bar{b}$" and receipt of the $\overline{EOW}$ signal, a logical one is clocked into the least significant bit of shift register 835. After the data from flip flops 833 and 834 have been clocked into shift registers 835 and 836, respectively, upon the receipt of an $\overline{EOW}$ signal, a low signal is applied to terminal 841 which is connected to the reset ($\bar{R}$) input leads of flip flops 833 and 834, thus resetting the Q output signals of flip flops 833 and 834 low. This reset signal applied to terminal 841 may comprise, for example, a signal $\overline{EOW}'$, which is derived from but delayed by approximately 75 microseconds from the $\overline{EOW}$ signal, thus resetting flip flops 833 and 834 after the data appearing on their Q output leads have been clocked into shift registers 835 and 836, respectively, upon receipt of a low $\overline{EOW}$ signal. At the beginning of a search, a logical low signal is applied in a well known manner to node 840a which is connected to the reset ($\bar{R}$) input leads of shift registers 835 and 836, thus resetting each bit within shift registers 835 and 836 to logical zeros. Upon each subsequent $\overline{EOW}$ signal, the data in shift registers 835 and 836 is shifted to the next most significant bit, with output data from SR flip flops 833 and 834 being input to the least significant bits of shift registers 835 and 836, respectively. Accordingly, the signals appearing on output leads T1 through Tj of shift register 835 indicate which one or ones of the previous j words decoded was equal to "bat$\bar{b}$", and the signals on the output leads P1 through Pj of shift register 836 indicates which one of the previous j words decoded was equal to "ball$\bar{b}$". In this example, it is desired to locate occurrences of the word "bat$\bar{b}$" within four words of the word "ball$\bar{b}$". Accordingly, the four least significant output leads of shift registers 835 and 836 are connected to the input leads of NOR gate 837 and 838, respectively. Thus, NOR gate 837 generates a low output signal when the word "bat$\bar{b}$" is one of the four most recently decoded words, and similarly, NOR gate 838 provides a low output signal when the word "ball$\bar{b}$" has been one of the four most recently decoded words. The output leads of NOR gates 837 and 838 are connected to the input leads of NOR gate 839, thus providing a high output signal from NOR gate 839 which is available on node 840 when both the words "bat$\bar{b}$" and "ball$\bar{b}$" have been decoded within four words of each other.

The shift registers 835 and 836 are reset in a number of desired ways. First, as previously described, on beginning a search, shift registers 835 and 836 are cleared. Shift registers 835 and 836 are also cleared upon receipt of a high output signal from NOR gate 839, thus indicating that the desired words have been decoded within four words of each other. This reset procedure is designed to prevent erroneous multiple high signals on the output lead of NOR gate 839 under certain circumstances when the desired words have been decoded. For example, if the desired words are adjacent to each other, and shift registers 835 and 836 are not reset upon their first detection, NOR gate 839 will provide a high output signal when the desired words are the two most recently decoded words, the second and third most recently decoded words, and the third and fourth most recently decoded words, thus providing three signals for the same occurrence of the two desired words. Thus, by resetting shift registers 835 and 836 upon receipt of a high output signal from NOR gate 839, such erroneous multiple signals will be prevented. Finally, shift registers 835 and 836 may, if desired, be reset upon receipt of an $\overline{\text{EOS}}$ signal, thus requiring the desired words to appear in the same sentence. Alternatively, shift registers 835 and 836 may be reset by the $\overline{\text{EOP}}$ signal or the $\overline{\text{EOD}}$ signal, thus requiring the desired words to be located within the same paragraph, or the same document, respectively.

Figure 7B:
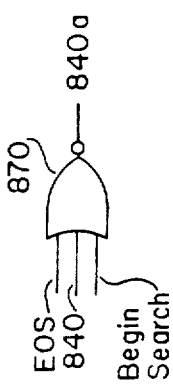

FIG. 7b shows NOR gate 870 having its input leads connected to the EOS signal, the output signal from NOR gate 839 appearing on terminal 840, and a signal labelled as "begin search", which is high when a search is to begin. Accordingly, NOR gate 870 will provide a low output signal which is connected to terminate 840a of FIG. 7a to reset shift registers 835 and 836 at the beginning of each search, at the end of each sentence, and upon detection of the desired words and their desired relationship by receipt of a high signal on terminal 840.

Those of ordinary skill in the art, in light of the teachings of this invention, are also able to construct a logical operation section 14 which will detect the occurrence of a first desired word within a fixed number of sentences of a second desired word. Logical operator section 14 of FIG. 7a may be used for this purpose with but a few modifications. For example, shift registers 835 and 836 will, in this instance, receive their clock signals from the $\overline{\text{EOS}}$ signal, and flip flops 833 and 834 will be reset by a delayed $\overline{\text{EOS}'}$ signal applied to terminal 841. Furthermore, the NAND gate 870 of FIG. 7b will receive as its input signals the EOP signal in place of the EOS signal, if it is desired that the two words appear within the same paragraph. Alternatively, the EOS signal applied to NOR gate 870 of FIG. 7b is replaced by the EOD signal, when it is desired that the two desired words appear in the same document.

Furthermore, it is to be understood that the decoder 12 and decoded data memory 13 (FIG. 1) can be used with logical operator section 14 other than those specific embodiments provided in this specification. Similarly, the logical operator section 14 need not be used with the specific embodiments of decoder 12 and decoded data memory 13 provided in this specification.

The logical operator section 14 (FIG. 1) can comprise hardwired logical gates which serve to search for desired character strings. Alternatively, logical operator section 14 may comprise a large number of logical gates, including AND gates, OR gates, NOR gates, flip-flops, and the like, which may be programmably connected in order to provide the desired character search, in order to be highly flexible in performing searches. The use of cross-point switch arrays, and particularly such arrays implemented as integrated circuits, will be useful in the construction of logical operator section 14. One such 256 by 256 cross-point switching array is described in an article entitled "Cross-Point Array IC Handles 256 Voice and Data Channels", written by Lloyd Reaume and appearing in Electronics Magazine, Oct. 6, 1981, pages 133-135. Such a cross-point switch array is useful for connecting the plurality of output leads from the shift registers of decoded data memory 13 contained within bus 13a, the EOW, EOS, EOP, and EOD signals, as well as providing interconnections between the logical gates of logical operators section 14. Utilizing a suitable computer program, the operation of such cross-point switch arrays within logical operators section 14 may be accomplished as a result of simple commands describing the desired search. The computer is programmed to receive the commands and operate the cross-point switch array in such a manner as to provide proper connection between the leads within bus 13a, the EOW, EOS, EOP and EOD leads, and the logical gates within logical operator section 14.

As previously described, upon the decoding of the desired character string, logical operator section 14 generates a signal on bus 14a, which is connected to central processing unit (CPU) 15 (FIG. 1). CPU 15 then operates as programmed, for example, to store the document number containing the desired character string, print the sentence containing the desired character string, and the like.

SECOND EMBODIMENT

System Overview

Figure 8:
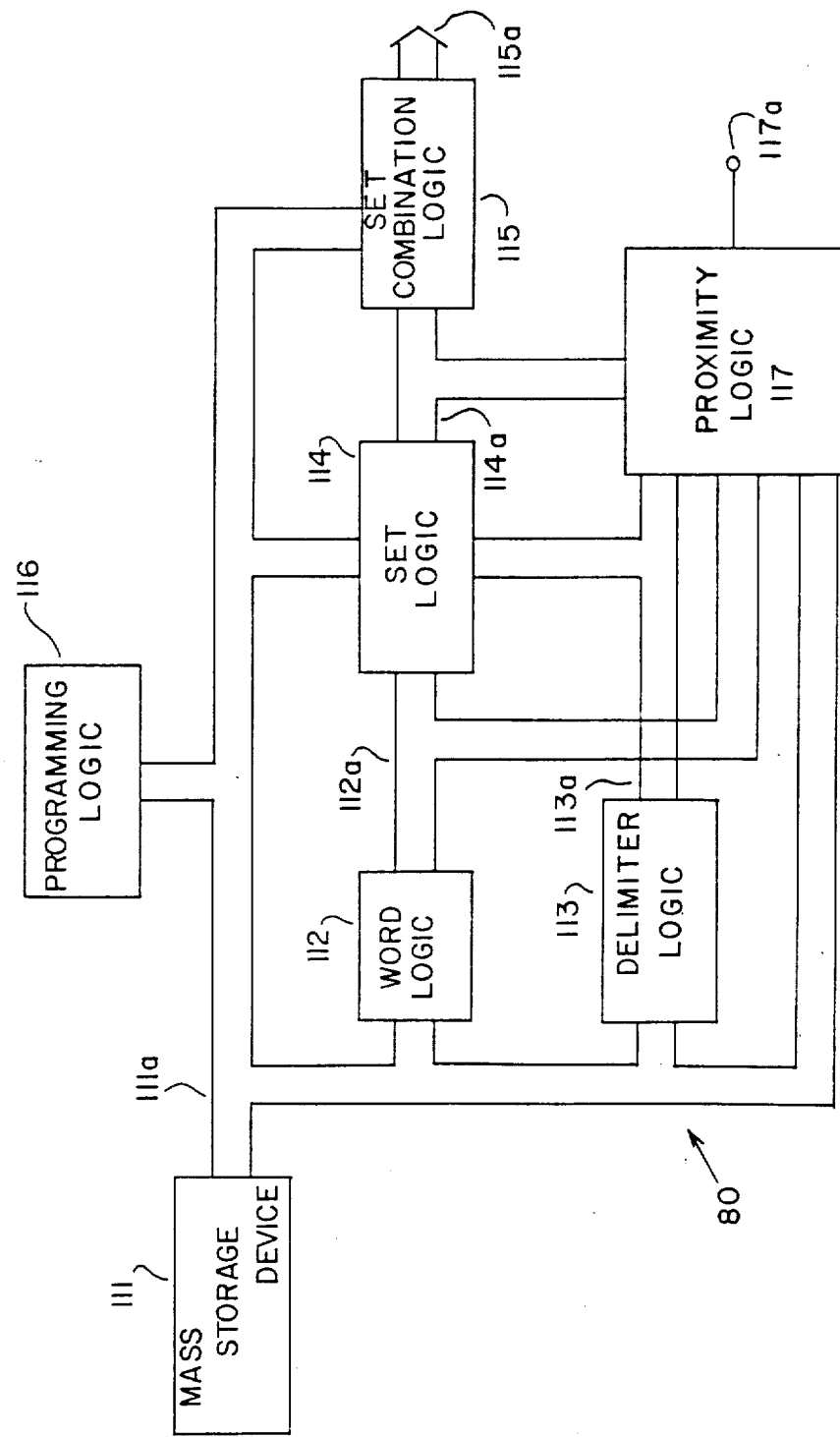
FIG. 8 is a block diagram of a textual comparator construction in accordance with a second embodiment of this invention.

A second embodiment of a text comparator constructed in accordance with this invention is depicted in the block diagram of FIG. 8. Text comparator 80 includes mass storage device 111 which, as previously described in conjunction with the first embodiment of this invention, stores a large amount of textual data, often referred to as the "data base." Data stored in mass storage device 111 is transferred via bus 111a and made available to word logic 112, delimiter logic 113, set logic 114, set combination logic 115, proximity logic 117, and programming logic 116, as is fully described below. Delimiter logic 113 serves to monitor the characters transferred from mass storage device 111 on bus 111a and provides discrete signals depicting whether the character being transferred is a predefined delimiter character. Such delimiter characters include, for example, special characters or groups of characters denoting the end of a word (EOW), end of a paragraph (EOP), end of a sentence (EOS), end of a document (EOD), end of a chapter (EOC), and the end of a title (EOT). The delimiter signals provided by delimiter logic 113 are required in order to allow the text comparator 80 to determine, for example, when two specified words occur within the same sentence or within the same paragraph, as is fully described below.

Word logic 112 serves to store data regarding predefined words (i.e., strings of characters) which are to be located within the text stored in mass storage device 111. Word logic 112 then provides output word signals on bus 112a indicating when such predefined words have been located in the character string being transferred from mass storage device 111 via bus 111a. These word signals are transferred via bus 112a to set logic 114 and proximity logic 117.

Set logic 114 receives the delimiter signals from delimiter logic 113 via bus 113a and word signals from word logic 112 via bus 112a and determines when selected words are located in the same sentence, same paragraph, etc., as desired, and provides output signals on bus 114a indicating when predefined words or strings of characters have been so located.

The output signals from set logic 114 are applied to set combination logic 115, which serves to combine the signals from set logic 114 in order to generate output signals on output bus 115a indicating when the textual information transferred from mass storage device 111 on bus 111a meets the desired search strategy selected by the user.

Proximity logic 117 receives input signals from buses 111a, 112a, 113a and 114a and combines this information in order to provide output signals indicating when predefined words detected by word logic 112, or predefined set of words, as detected by set logic 114, or a combination of this information, occurs within a predefined proximity. For example, proximity logic 117 will determine if a first selected word occurs within N (where N is a selected integer) words of a second preselected word.

Programming logic 116 serves to receive search strategy instructions from the user and in response thereto provide the proper timing, addressing, and data signals via bus 111a to word logic 112, delimiter logic 113, set logic 114, set combination logic 115, and proximity logic 117 to cause to be stored within these elements the information required to perform the desired search strategy.

While for ease and understanding word logic 112, delimiter logic 113, set logic 114, set combination logic 115, and proximity logic 117 will now be described in separate subsections of this specification, it is to be understood that each of these elements is, if required, programmed by programming logic 116 prior to the execution of a user defined textual search strategy.

Delimiter Logic 113

Figure 9:
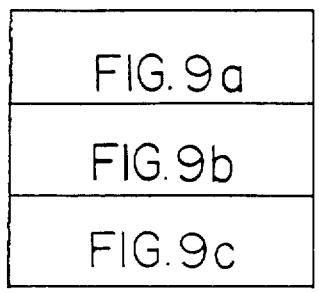
FIG. 9 is a diagram depicting the relationship between FIGS. 9a, 9b and 9c which form a schematic diagram of the delimiter logic 113 shown in FIG. 8.
Figure 9A:
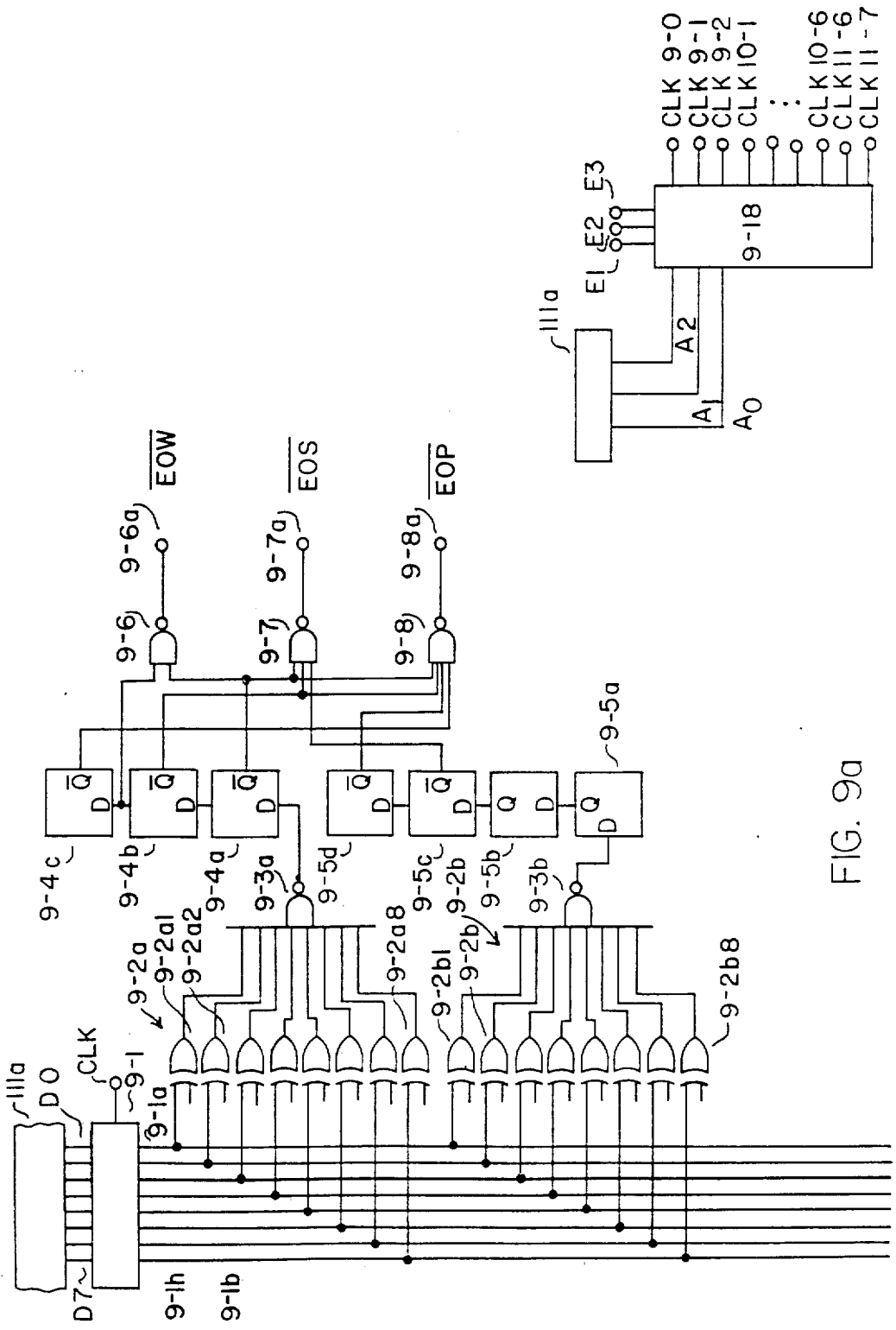
Figure 9B:
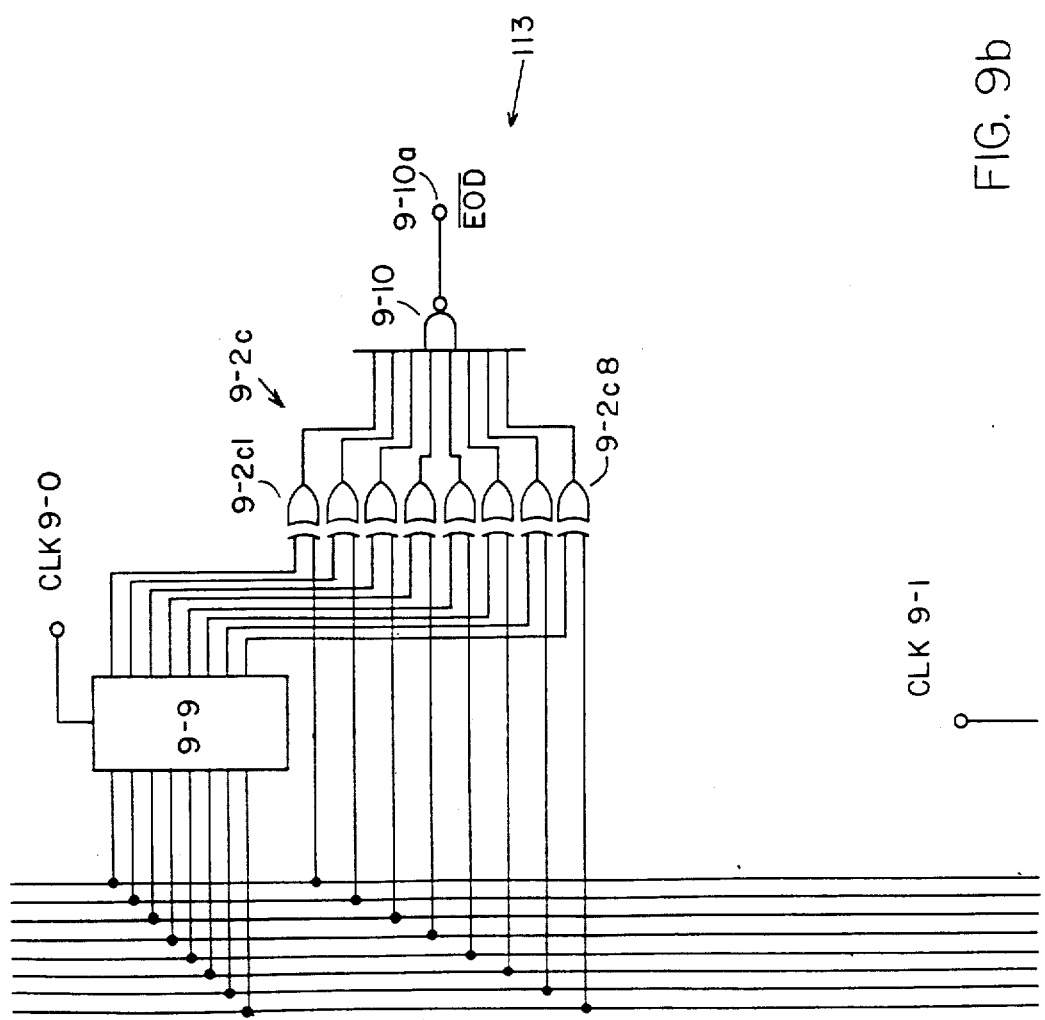
Figure 9C:
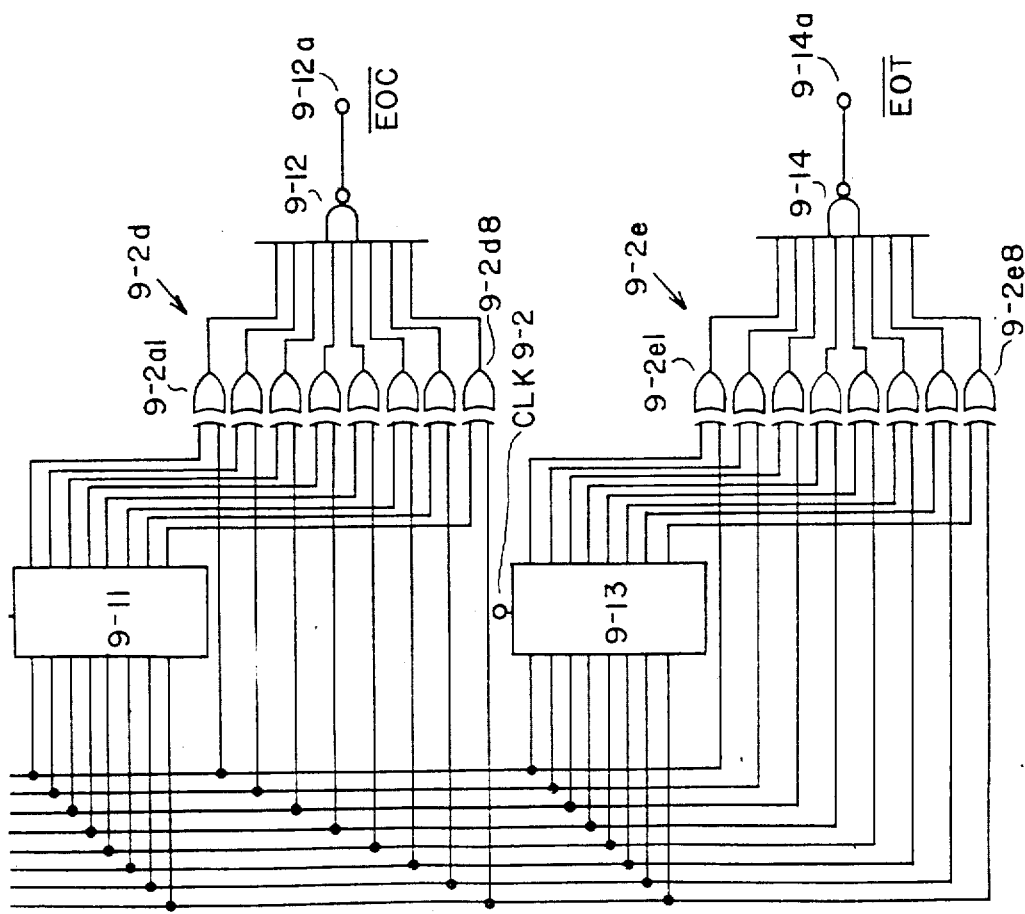
Figure 10A:
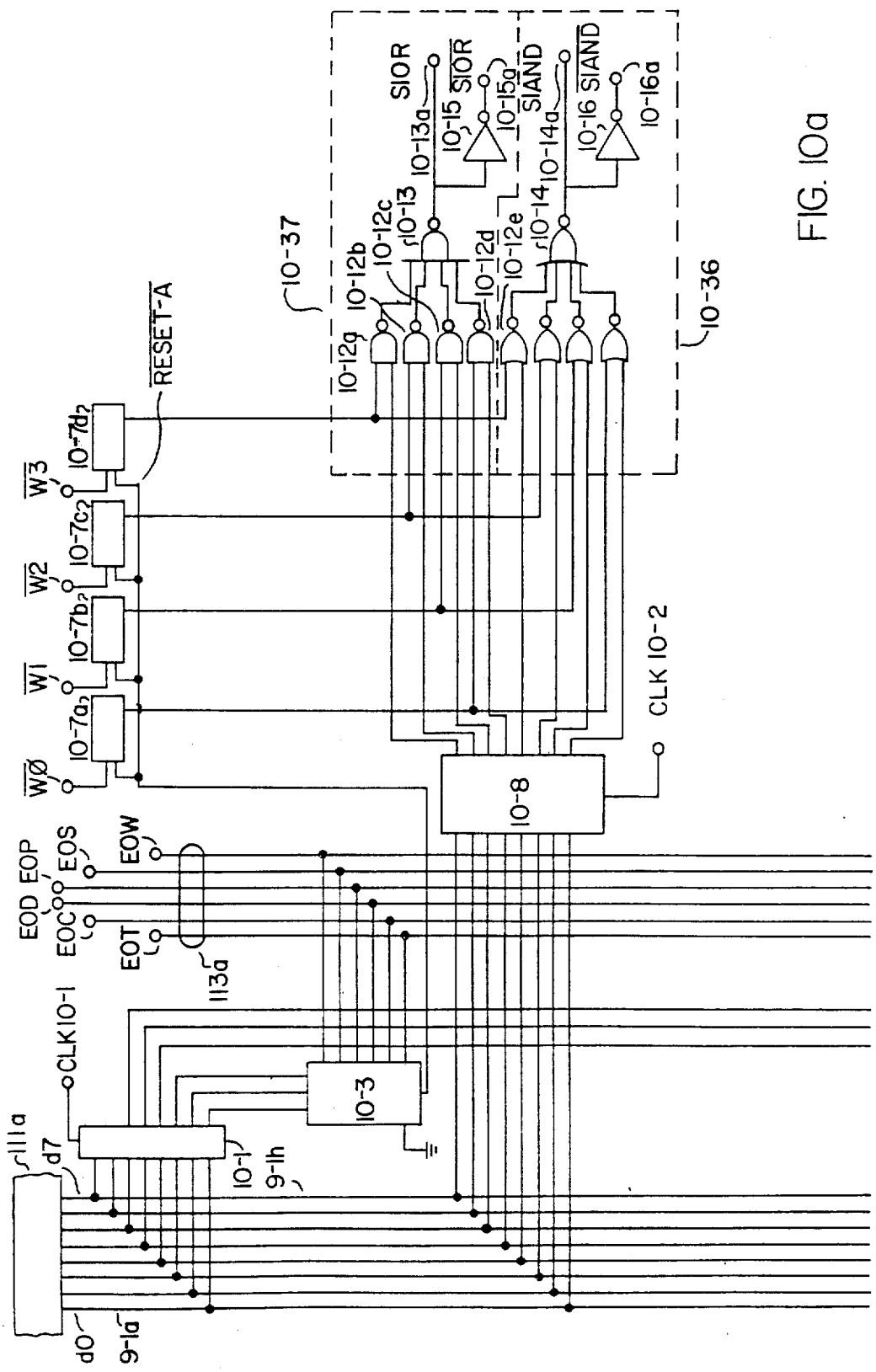
Figure 10B:
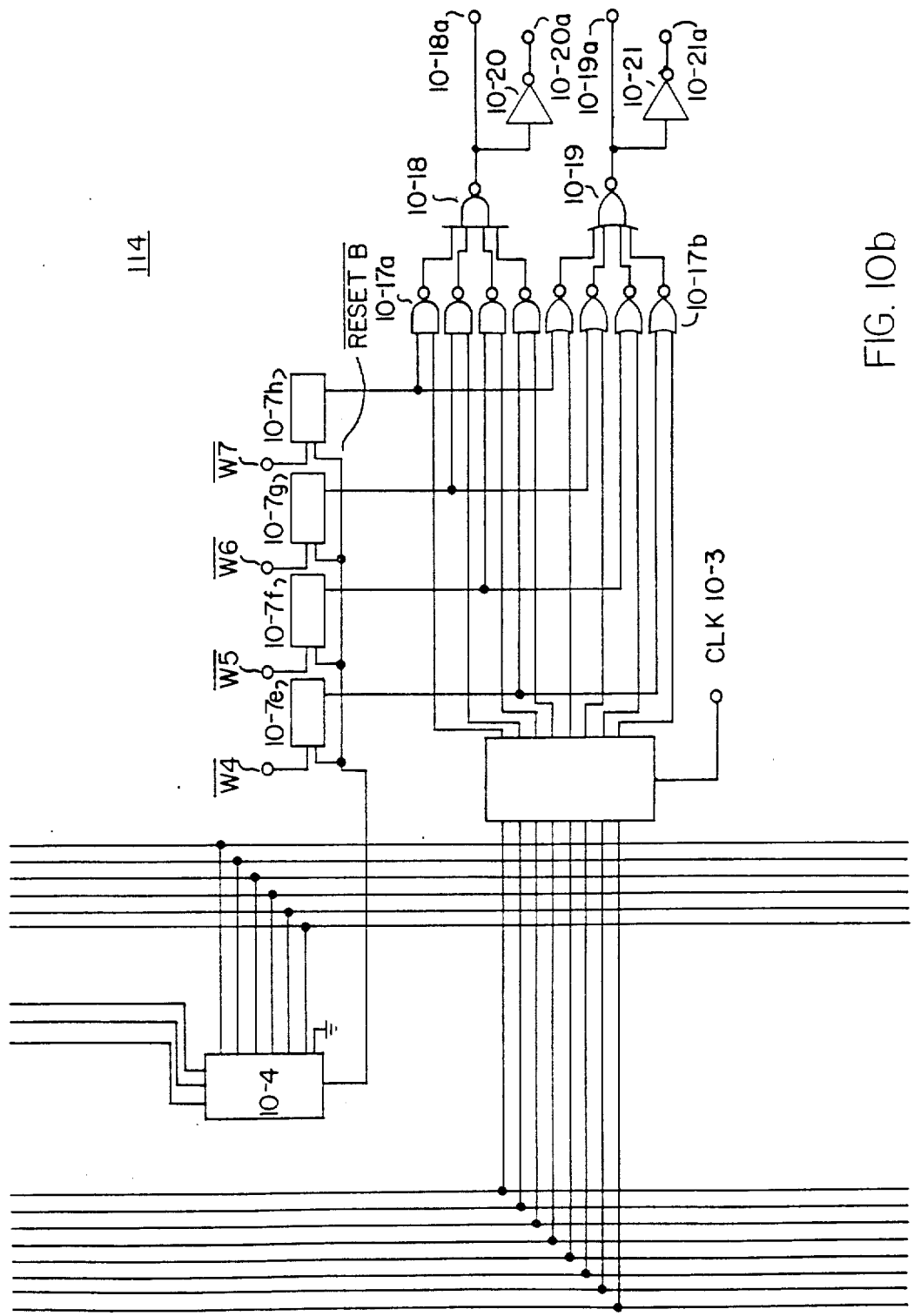
Figure 10C:
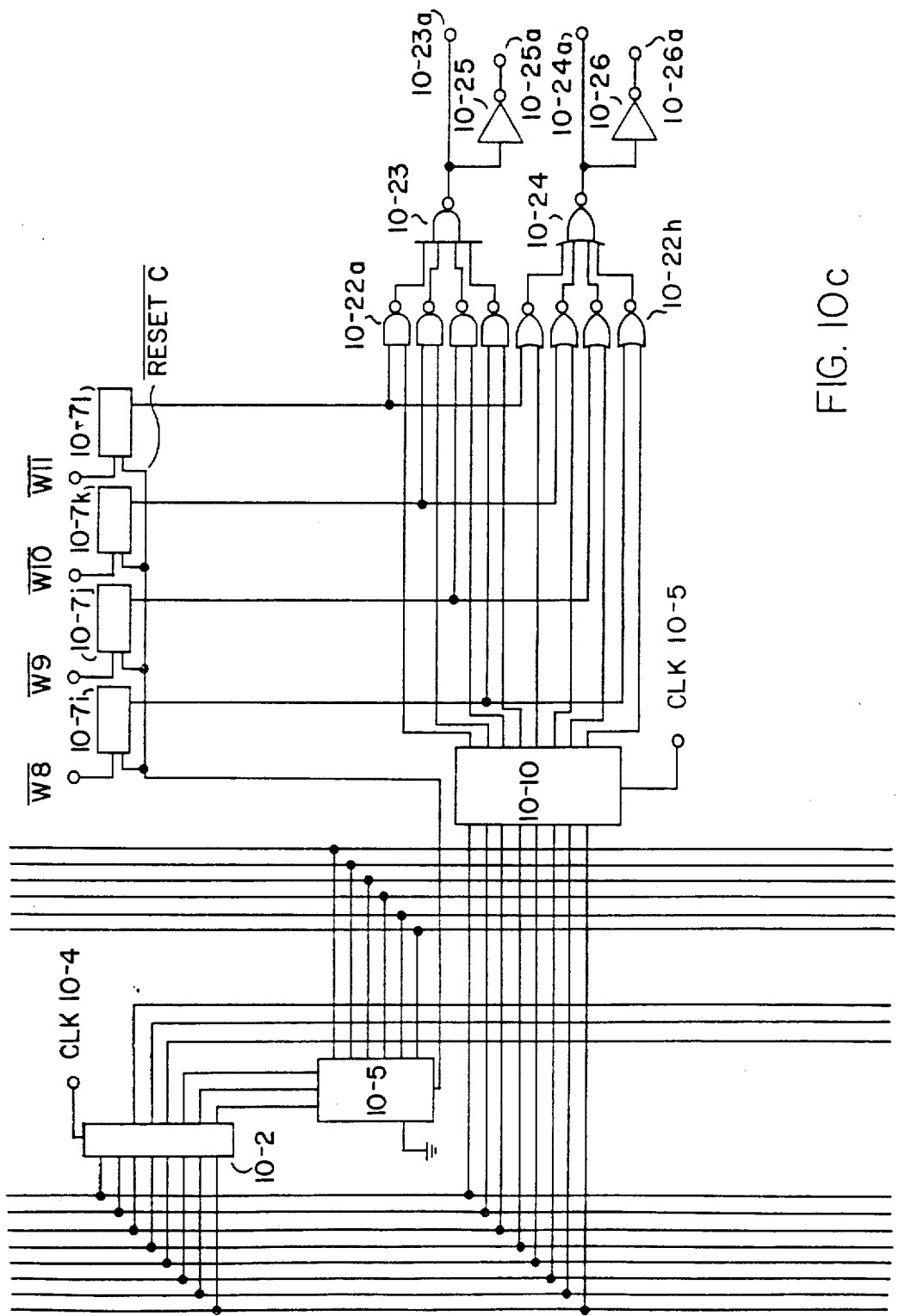
Figure 10D:
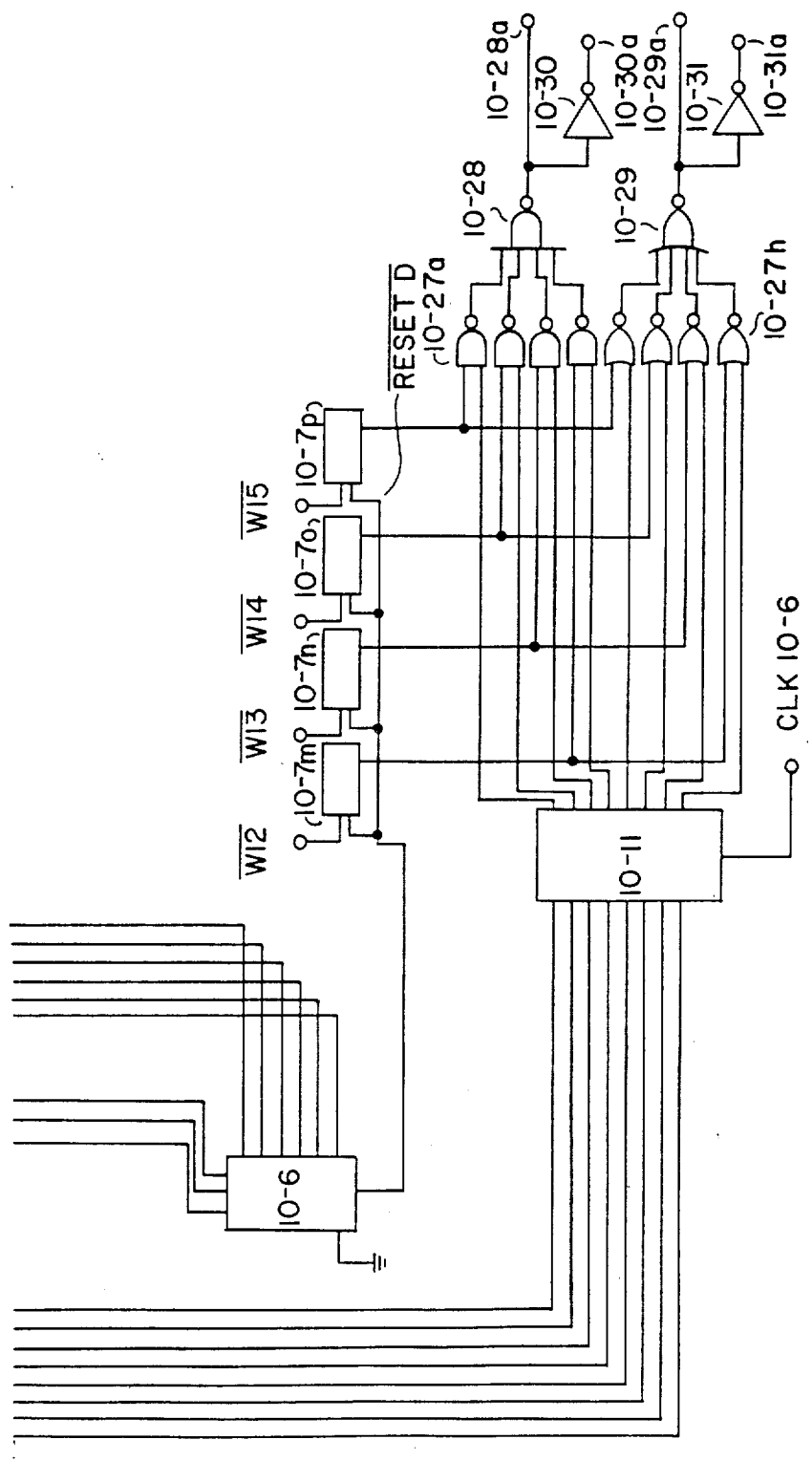
Figure 11A:
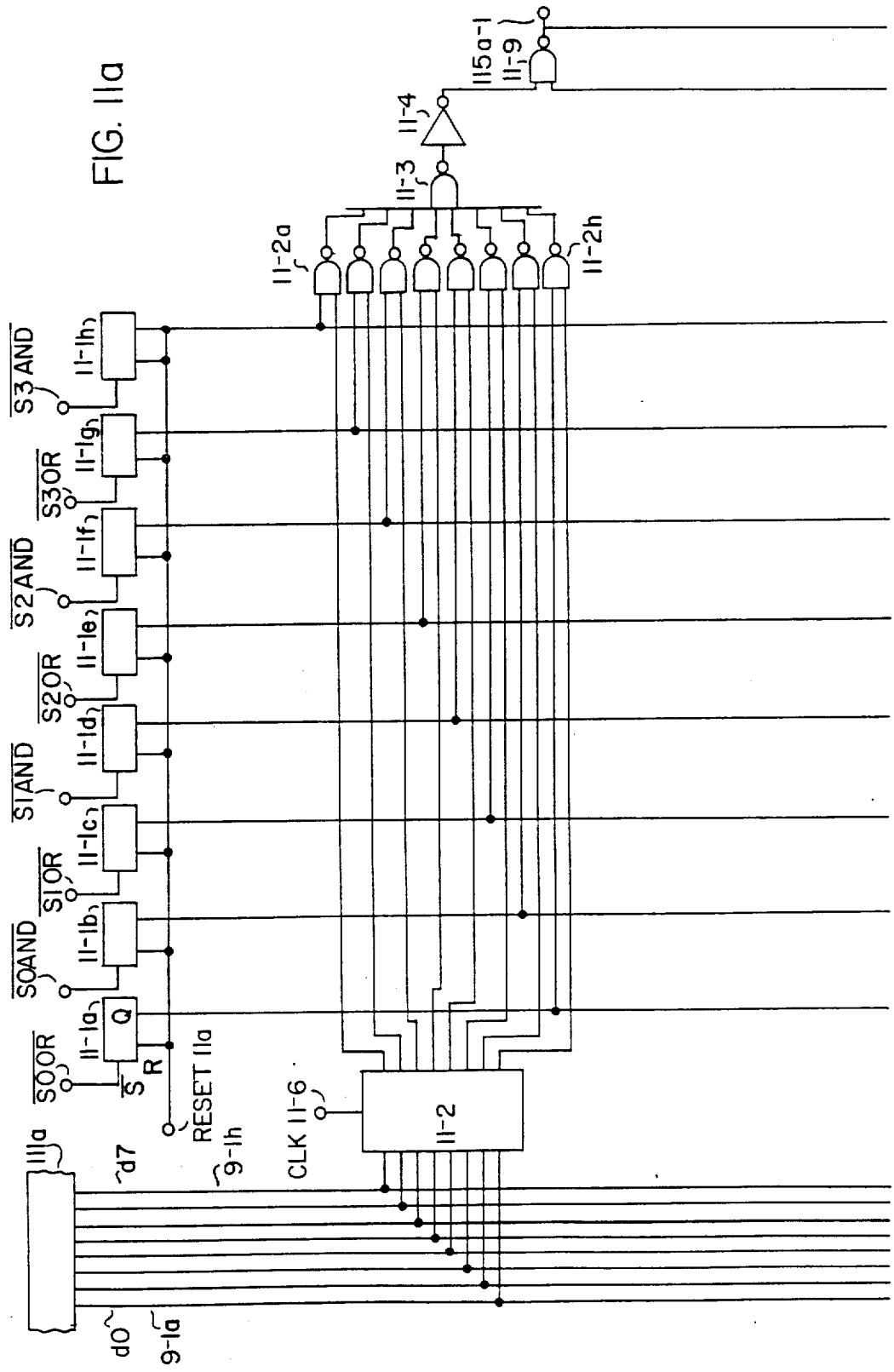
Figure 11B:
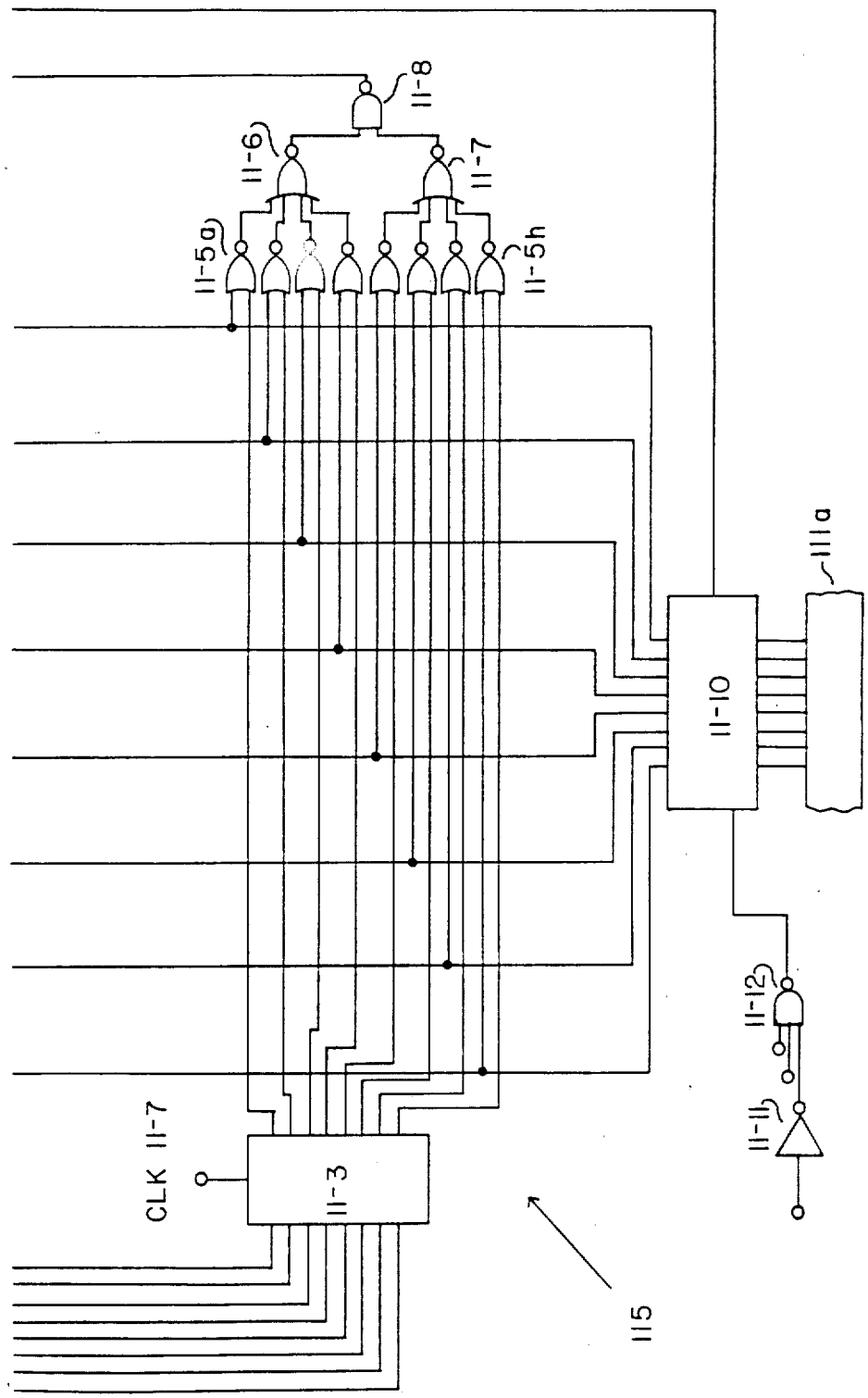
Figure 12A:
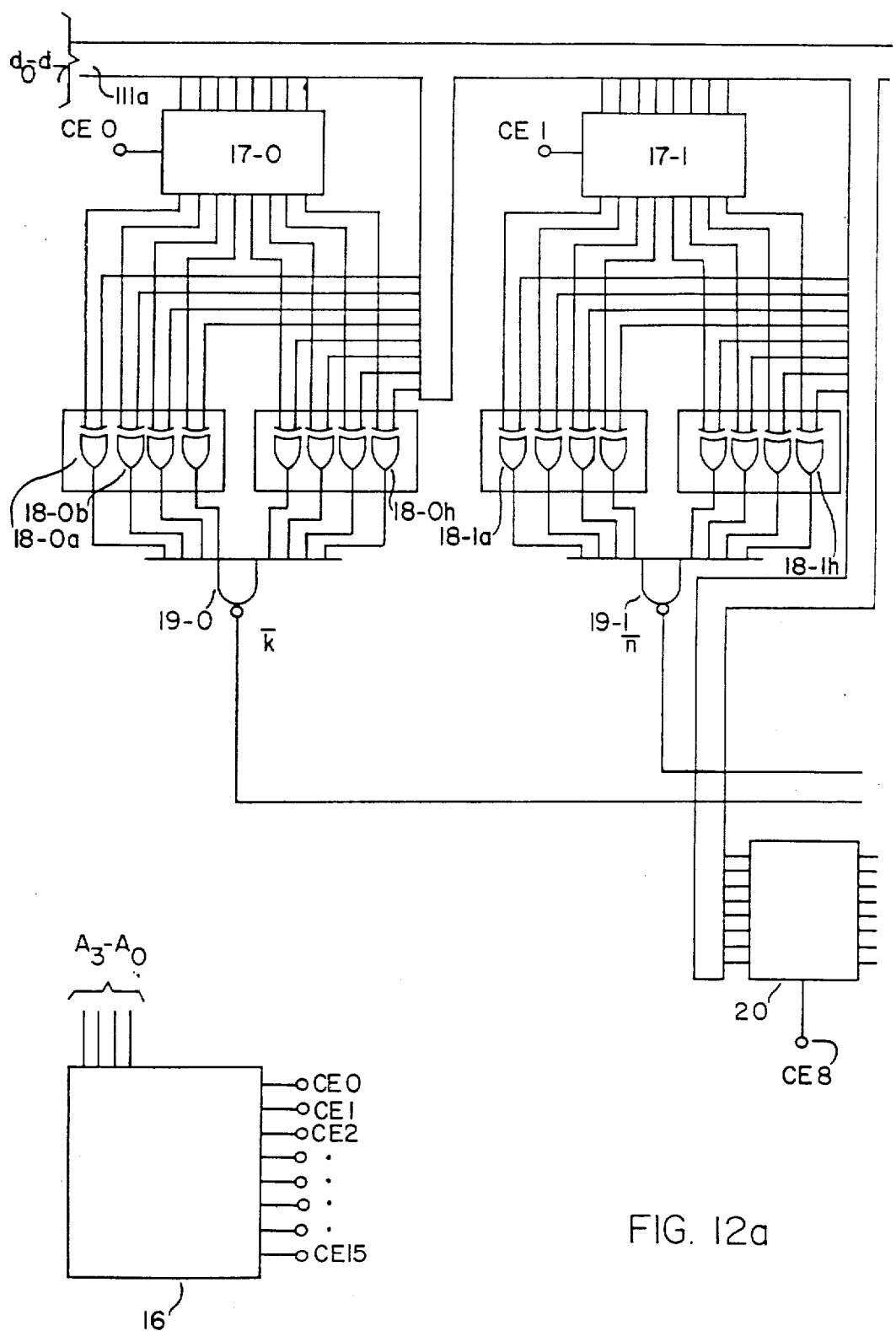
Figure 12B:
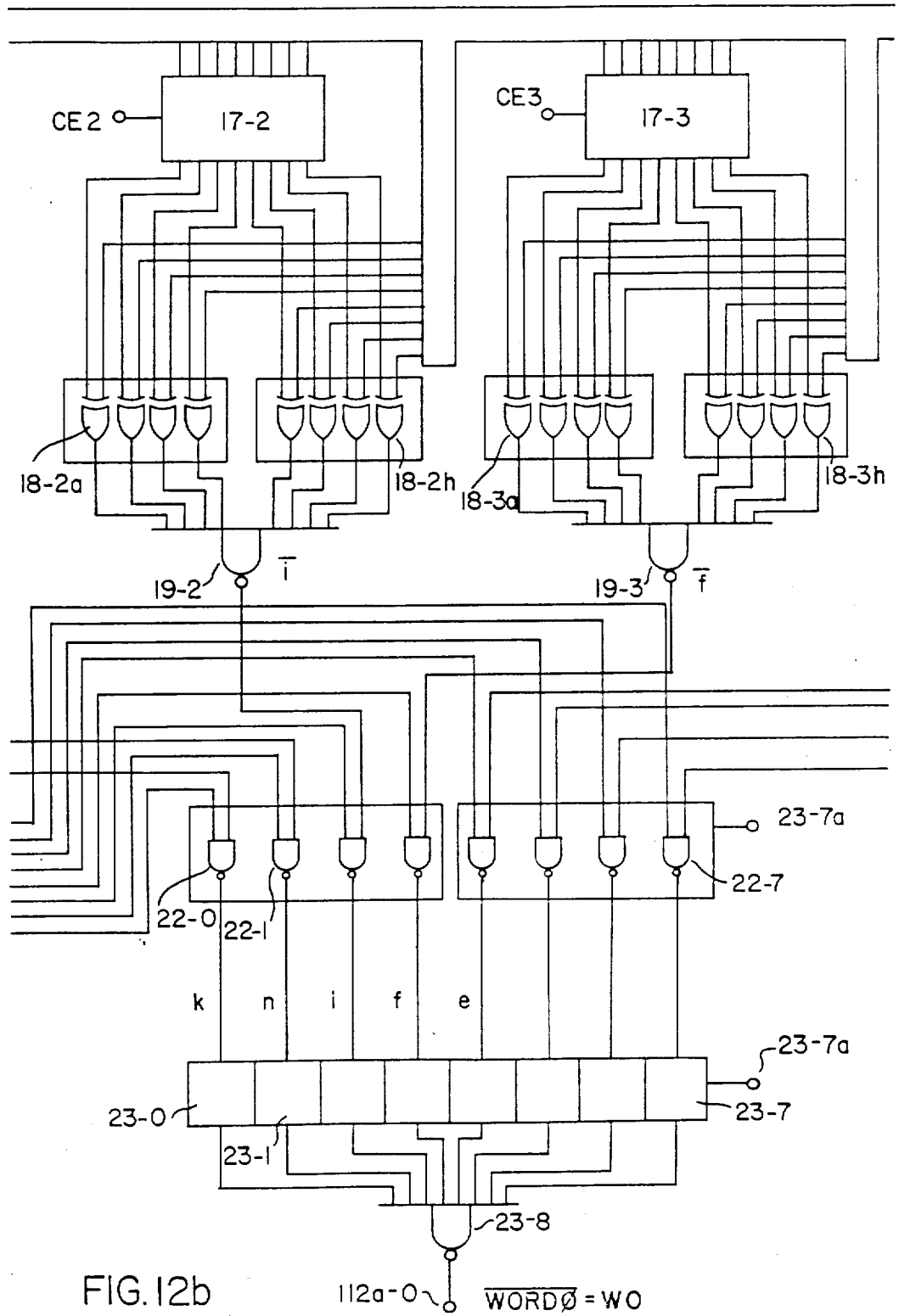
Figure 12C:
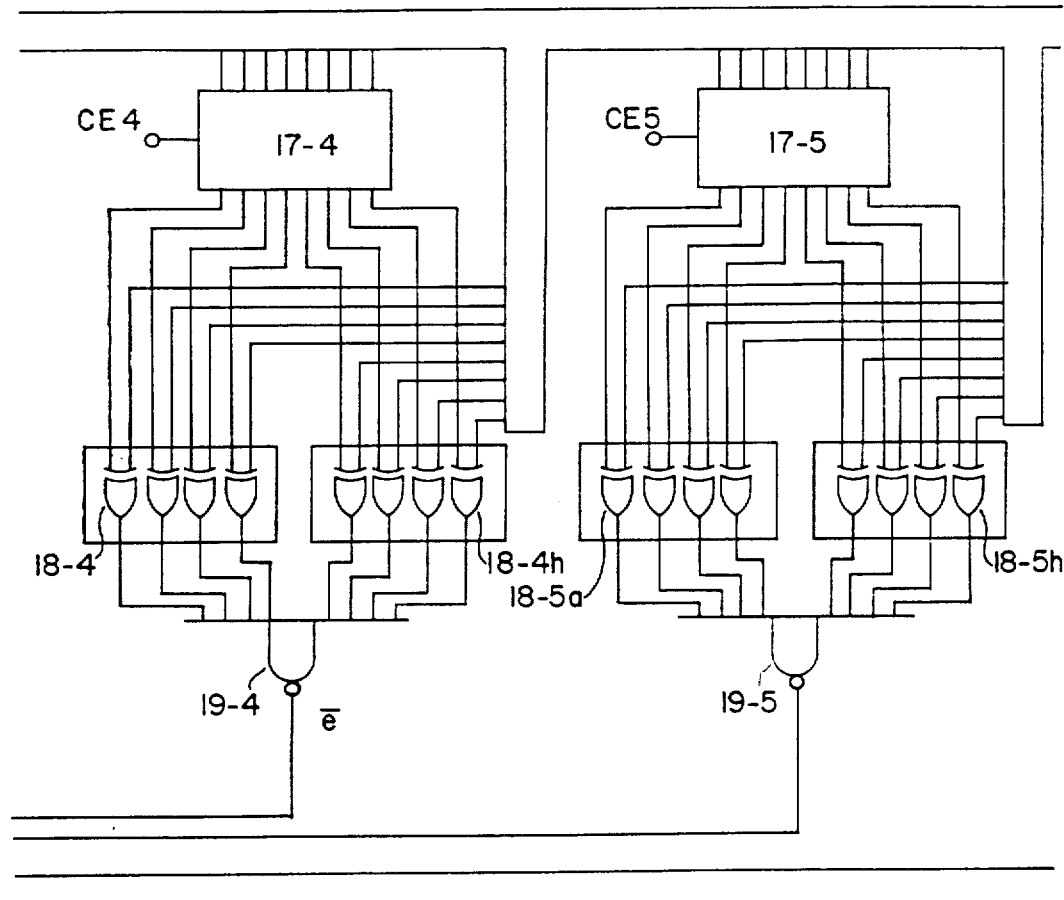
Figure 12D:
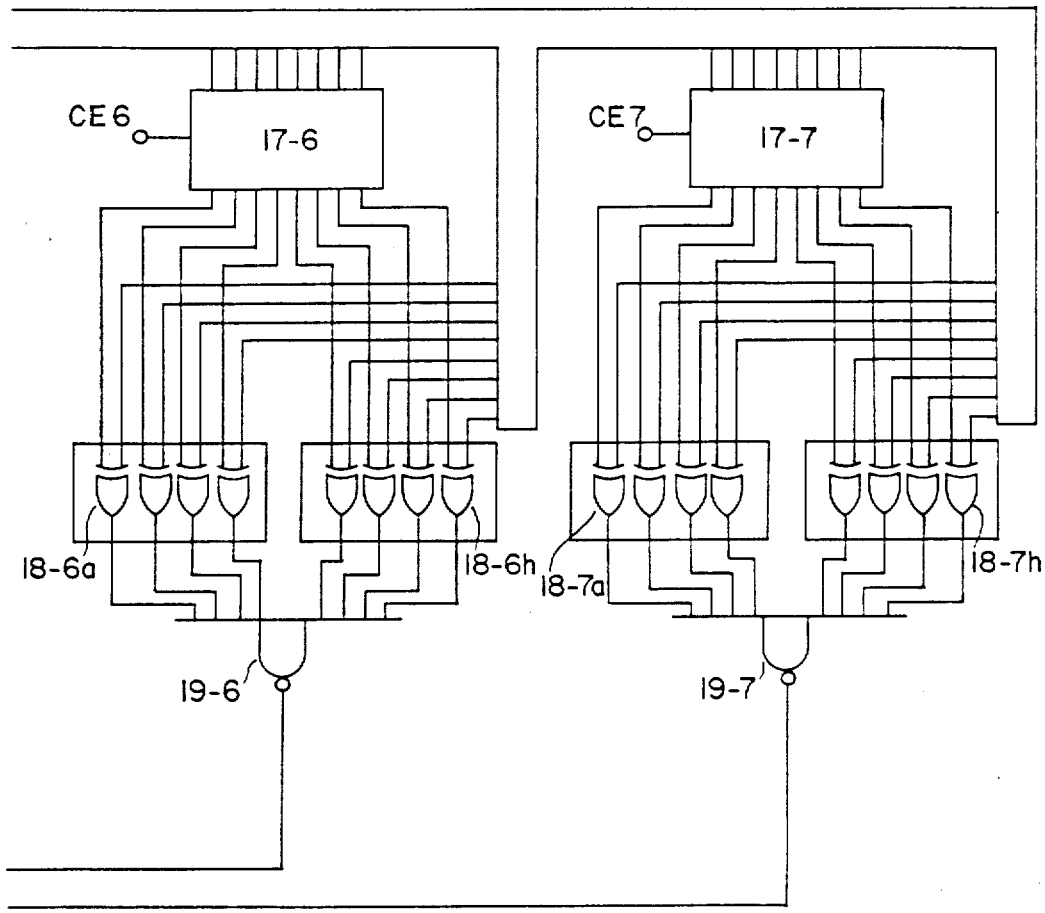
Figure 13A:
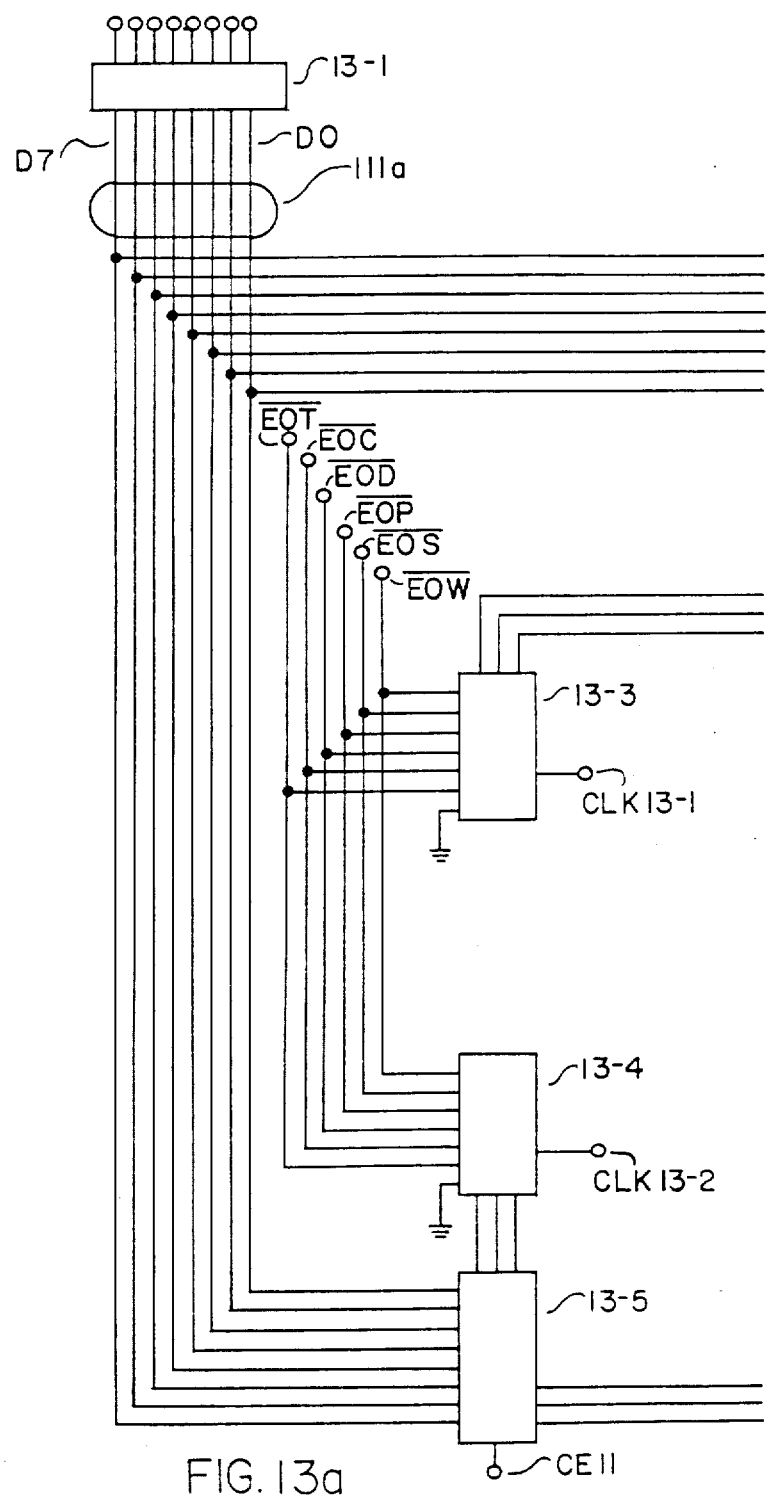
Figure 13B:
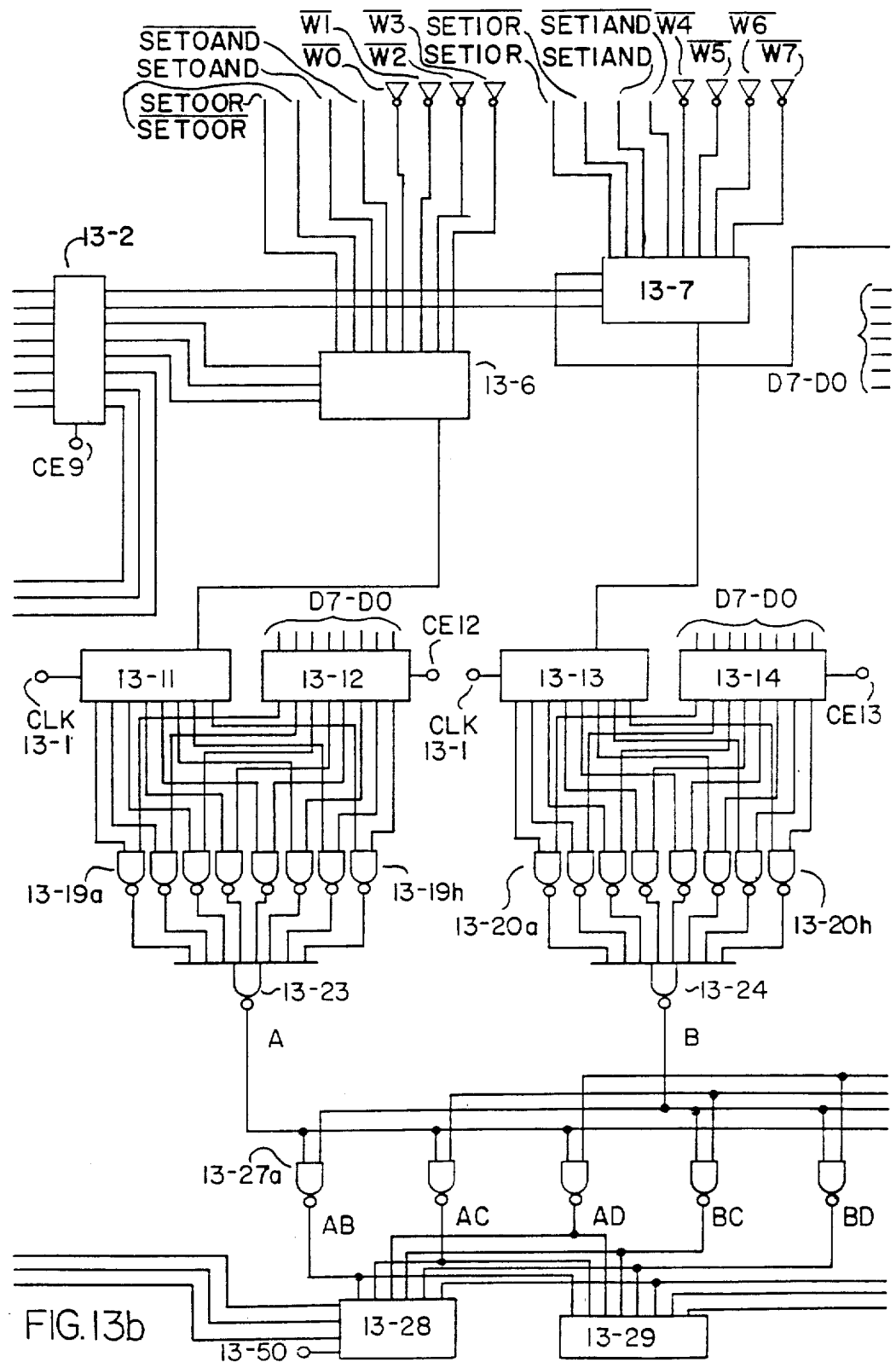
Figure 13C:
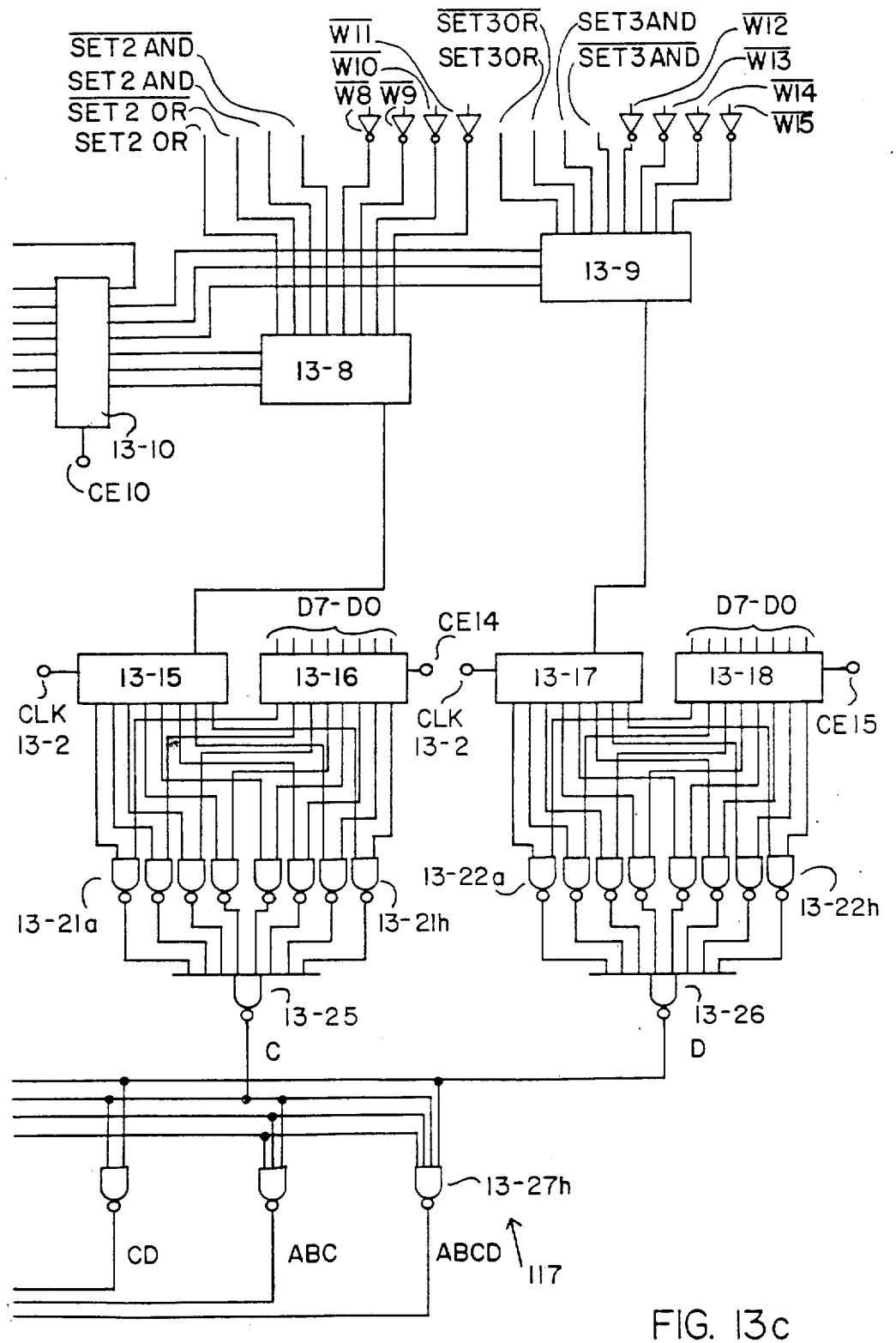

FIG. 9 depicts the relationship between FIGS. 9a through 9c which in turn form a schematic diagram of one embodiment of delimiter logic 113. Delimiter logic 113 provides on its output leads 9-6a, 9-7a, 9-8a, 9-10a, 9-12a, and 9-14a, delimiter signals indicating, for example, the end of a word, end of a paragraph, end of a document, etc. These output leads 9-6a, 9-7a, 9-8a, 9-10a, 9-12a and 9-14a form bus 113a of FIG. 8.

In many textual data bases, the end of a word (EOW) is indicated by a non-blank character followed by a blank. This is preferred over the technique used by some textual data bases where the end of a word is indicated simply by a blank character, because at the end of a sentence and at the end of a paragraph numerous blanks may occur in sequence, providing a corresponding plurality of undesired end of word signals. Similarly an end of a sentence is often indicated by a period followed by two blanks, and an end of paragraph is indicated by a period followed by three blanks.

The portion of the delimiter logic 113 shown in FIG. 9a serves to detect the occurrence of a blank, a non-blank character, and a period and also combines these three characters in order to provide $\overline{EOW}$, $\overline{EOS}$ and $\overline{EOP}$ signals on output leads 9-6a through 9-8a, respectively. The eight bit data word comprising bits D0 through D7 is latched into latch 9-1 upon receipt of a clock signal (CLK) which is provided by mass storage device 111 on bus 111a to indicate that a valid data word is present on bus 111a. Latch 9-1 comprises, for example, a 74373 device manufactured by National Semiconductor Corporation (hereinafter referred to as "National"). Latch 9-1 serves to store data received on bus 111a and provide this data to the remainder of delimiter logic 113 until the next data word has been set onto bus 111a. Thus latch 9-1 provides bits D0 through D7 on leads 9-1a through 9-1h. Each bit D0 through D7 is uniquely applied to one input lead of exclusive OR gates 9-2a1 through 9-2a8, and are also uniquely applied to one input lead of exclusive OR gates 9-2b1 through 9-2b8. The remaining input leads of exclusive OR gates 9-2a1 through 9-2a8 are connected either to a logical zero signal (typically zero volts) or a logical one signal (typically 5 volts) in order to program exclusive OR gates 9-2a1 through 9-2a8 so as to detect when a blank character is transmitted on bus 111a. Similarly, the remaining input leads of exclusive OR gates 9-2b1 through 9-2b8 are connected either to a logical zero signal or a logical one signal in order to program exclusive OR gates 9-2b1 through 9-2b8 so as to detect when a period is transmitted on bus 111a.

Referring to table 1, it is seen that in ASCII, a blank is a hexadecimal 20 (binary 00100000). Accordingly, the program leads of exclusive OR gates 9-2a1 through 9-2a8 (i.e., those leads not connected to data bits D0 through D7 provided by leads 9-1a through 9-1h, respectively) are programmed to the binary signal corresponding to the inverse of the binary signal representing a blank. Thus, the program leads of exclusive OR gates 9-2a1 through 9-2a8 are programmed to binary 11011111, respectively. In this manner, when a blank signal is transmitted on bus 111a and stored in latch 9-1, the D0 through D7 signals applied to each exclusive OR gate 9-2a1 through 9-2a8 are opposite the program signal applied to these exclusive OR gates, and each exclusive OR gate 9-2a1 through 9-2a8 provides a logical one output signal on its output lead.

The output signals from exclusive OR gates 9-2a1 through 9-2a8 are applied to the input leads of NAND gate 9-3a. Thus, when a blank character is transmitted on bus 111a, each input signal to NAND gate 9-3a is a logical one, and the $\overline{blank}$ output signal from NAND gate 9-3a is a logical zero, indicating that a blank character has been transmitted.

Conversely, when a nonblank character is transmitted on bus 111a and stored in latch 9-1, at least one exclusive OR gate 9-2a1 through 9-2a8 receives a data signal D0 through D7 which is identical to the programming signal applied to that exclusive OR gate, and the output signal from that exclusive OR gate is a logical zero. Thus, the $\overline{blank}$ output signal from NAND gate 9-3a is a logical one, indicating that a nonblank character has been transmitted.

The output signal from NAND gate 9-3a is applied to the D input lead of D type flip-flop 9-4a. The Q output lead of flip-flop 9-4a is connected to the D input lead of D-type flip-flop 9-4b, whose Q output lead is in turn connected to the D input lead of D-type flip-flop 9-4c. Flip-flops 9-5a through 9-5d thereby providing signals indicating whether each of the last three characters transmitted was a blank or a nonblank character. D-type flip-flops 9-4a through 9-4c comprise, for example, one flip-flop of a 74175 quad D-type flip-flop manufactured by National. Flip flops 9-4a through 9-4c each receive their clock signals from the Valid Data signal provided by mass storage device 111 (FIG. 8) indicating that valid data is available on bus 111a.

Again referring to table 1, it is seen that in ASCII, a period is a hexadecimal 2E (binary 00101110). Accordingly, the program leads of exclusive OR gates 9-2b1 through 9-2b8 (i.e., those leads not connected to data bits D0 through D7 provided by leads 9-1a through 9-1h, respectively) are programmed to the binary signal corresponding to the inverse of the binary signal representing a period. Thus, the program leads of exclusive OR gates 9-2b1 through 9-2b8 are programmed to binary 11010001, respectively. In this manner, when a period signal is transmitted on bus 111a and stored in latch 9-1, the D0 through D7 signals applied to each exclusive OR gate 9-2b1 through 9-2b8 are opposite the program signal applied to these exclusive OR gates, and each exclusive OR gate 9-2b1 through 9-2b8 provides a logical one output signal on its output lead.

The output signals from exclusive OR gates 9-2b1 through 9-2b8 are applied to the input leads of NAND gate 9-3b. Thus, when a period character is transmitted on bus 111a, each input signal to NAND gate 9-3b is a logical one, and the $\overline{\phantom{-}}$ output signal from NAND gate 9-3b is a logical zero, indicating that the period has been transmitted.

Conversely, when a nonperiod character is transmitted on bus 111a and stored in latch 9-1, at least one exclusive OR gate 9-2b1 through 9-2b8 receives a data signal D0 through D7 which is identical to the programming signal applied to that exclusive OR gate, and the output signal from that exclusive OR gate is a logical zero. Thus, the $\overline{\phantom{-}}$ output signal from NAND gate 9-3b is a logical one, indicating that a non-period character has been transmitted.

The output signal from NAND gate 9-3b is applied to the D input lead of D type flip-flop 9-5a. The Q output lead of flip-flop 9-5a is connected to the D input lead of D-type flip-flop 9-5b, whose Q output lead is in turn connected to the D input lead of D-type flip-flop 9-5c, whose Q output lead is in turn connected to the D input lead of D-type flip-flop 9-5d. Flip-flops 9-5a through 9-5d, D-type flip-flops 9-5a through 9-5d comprise, for example, one flip-flop of a 74175 quad D-type flip-flop manufactured by National. Flip-flops 9-5a through 9-5d, each receive their clock signals from the Valid Data signal provided by mass storage device 111 (FIG. 8) indicating that valid data is available on bus 111a.

Because the end of a word is indicated by a nonblank character followed by a blank character, one input lead of NAND gate 9-6 is connected to the Q output lead of flip-flop 9-4b and one input lead of NAND gate 9-6 is connected to the $\overline{Q}$ ouput lead of flip-flop 9-4a. Thus, when the character most recently transmitted on bus 111a is a blank, the $\overline{Q}$ output signal from flip flop 9-4a is a logical one. Similarly, when the preceding character transmitted on bus 111a is a nonblank character, the Q output signal from flip-flop 9-4b is a logical one. With both input leads of NAND gate 9-6 receiving logical one signals, the $\overline{EOW}$ output signal generated by NAND gate 9-6 and available on output lead 9-6a is a logical zero, indicating that the end of a word has been detected. At all other times, either the $\overline{Q}$ output lead of flip flop 9-4a will provide a logical zero signal (indicating that the character most recently transmitted on bus 111a is a nonblank character) or the Q output lead from flip flop 9-4b will provide a logical zero signal, indicating that the previously received character was not a nonblank character, or both, thereby causing NAND gate 9-6 to generate a logical one $\overline{EOW}$ signal.

Similarly, because the end of a sentence is indicated by a period followed by two blanks, NAND gate 9-7, which generates a $\overline{EOS}$ signal on its output lead 9-7a, has one of its three input leads connected to each of the $\overline{Q}$ output leads of flip-flops 9-4a, 9-4b, and 9-5c. In this manner, when the two most recently received characters are blanks, flip-flops 9-4a and 9-4b provide logical one $\overline{Q}$ output signals, and when the character preceding these two blank characters is a period, flip-flop 9-5c provides a logical one $\overline{Q}$ output signal, thereby causing NAND gate 9-7 to generate a logical zero $\overline{EOS}$ signal on output lead 9-7a.

In a similar manner, the end of a paragrah is indicated by a period followed by three blanks. Thus, NAND gate 9-8 has one of its input leads connected to each of the $\overline{Q}$ output leads of flip-flops 9-4a, 9-4b, 9-4c, and 9-5d. In this manner, when the three most recently received characters are all blanks, flip flops 9-4a through 9-4c will provide logical one $\overline{Q}$ output signals to three input leads of NAND gate 9-8. When the character preceding these three blanks is a period, flip flop 9-5d will provide a logical one $\overline{Q}$ output signal to the remaining input lead of NAND gate 9-8, thereby causing NAND gate 9-8 to generate a logical zero $\overline{EOP}$ signal on output lead 9-8a. Conversely, when the four characters most recently transmitted on bus 111a are not a period followed by three blanks, at least one $\overline{Q}$ output signal from flip-flops 9-4a, 9-4b, 9-4c, and 9-5b will be a logical zero, thereby causing NAND gate 9-8 to generate a logical one $\overline{EOP}$ signal on output lead 9-8a indicating that the end of a paragraph has not been detected.

Because the EOW, EOS and EOP signals are rather universally indicated by a non-blank character followed by a blank, a period followed by two blanks, and by a period followed by three blanks, respectively, it is preferable to utilize arrays of exclusive OR gates 9-2a and 9-2b, each exclusive OR gate having a programming lead hard wired to a logical zero or logical one potential, in order to detect the end of a word, end of a sentence, and end of a paragraph. However, the EOD, EOC, and EOT signals are oftentimes stored within mass memory device 111 utilizing a variety of special characters, depending on the database used. For example, one system might store an EOD signal in mass memory device 111 as a hexadecimal FF, while another system might store an EOD signal in mass storage device 111 as a hexadecimal FA. Accordingly, it is desirable to provide delimiter logic 113 with the ability to be programmed in a manner that will allow delimiter logic 113 to detect the presence of the EOD, EOC and EOT signals, regardless of how those signals are stored in the mass storage device 111 of the particular system being used.

The remainder of the delimiter logic 113 shown in FIG. 9 is capable of being programmed to detect any three desired characters stored within mass storage device 111. In this embodiment, these three characters detected by the circuit of FIG. 9 are the characters which are used to indicate the end of a document (EOD), the end of a chapter (EOC) and the end of a title (EOT). The programming of delimiter logic 113 occurs prior to the transfer of data from mass storage device 111 to bus 111a for comparison. Prior to such transfer, programming logic 116 (FIG. 8) provides signals on bus 111a which serves to pre-program delimiter logic 113 as to the characters stored in mass storage device 111 which serve as the EOD, EOC and EOT delimiters. For example, programming logic 116 will first cause latch 9-9 (which comprises, for example a 74374 device manufactured by National) to store the inverse of the binary signal corresponding to the EOD delimiter character stored in mass storage device 111. Thus, for example, if the EOD delimiter characters stored in mass storage device 111 is a hexadecimal FF (binary 11111111) its inverse (binary 00000000) is stored in latch 9-9. This storage is performed by programming logic 116 providing on bus 111a data bits D0 through D7 equal to 00000000 and a suitable clock signal CLK to cause this data to be stored in latch 9-1. Programming logic 116 also provides an address signal of 000 on address leads A0 through A2, respectively, of bus 111a. The address signal 000 is applied to the address input leads of decoder 9-18 (which comprises, for example, a 74138 manufactured by National). Programming logic 116 also provides appropriate chip enable signals E1 through E3 to decoder 9-18, thereby enabling decoder 9-18. In response to these input signals, decoder 9-18 provides a positive going clock signal CLK 9-0 which is applied to latch 9-9. This positive going clock signal CLK 9-0 causes the data present on leads 9-1a through 9-1h (i.e., the data stored in latch 9-1 by programming logic 116) to be stored within latch 9-9. This data is stored in latch 9-9 until programming logic 116 stores another eight bit word in latch 9-9. Generally, because a given data base will not change the delimiter character such as EOD, this data need be loaded into latch 9-9 only once upon installation of the equipment. However, in order to insure reliable operation of the delimiter logic 113, it may be desirable to periodically reload latch 9-9 with a binary 00000000 in order to insure that the proper data is stored in latch 9-9 despite any incipient failures which would cause the data stored within latch 9-9 to deviate from its intended value.

During the operation of the text comparator, character data is transferred from mass storage device 111 (FIG. 8) to bus 111a and, in addition to being compared by exclusive OR gate arrays 9-2a and 9-2b, is simultaneously compared with the data stored in latch 9-9 by exclusive OR gate array 9-2c to determine whether an EOD character has been transmitted on bus 111a. Thus, when an EOD character (hex FF) is transmitted on bus 111a, a logical one signal will be applied to one input lead of each exclusive OR gate 9-2c1 through 9-2c8 of exclusive OR gate array 9-2c. The data stored within latch 9-9 is continuously applied to the other input leads of exclusive OR gates 9-2c1 through 9-2c8. Thus, when an EOD character is transmitted on bus 111a, the data signals D0 through D7 applied to one input lead of exclusive OR gates 9-2c1 through 9-2c8 will be the inverse of the data which is applied by latch 9-9 to the other input lead of exclusive OR gates 9-2c1 through 9-2c8, thereby causing each exclusive OR gate 9-2c1 through 9-2c8 to provide a logical one signal on its output lead. These output signals are in turn applied to the input leads of NAND gate 9-10, thus causing NAND gate 9-10 to provide a logical zero $\overline{EOD}$ signal on output lead 9-10a, indicating that an EOD character is present on bus 111a. Conversely, if a character other than an EOD character is transferred on bus 111a, at least one exclusive OR gate 9-2c1 through 9-2c8 receives a data signal D0 through D7 which is identical to the data which that exclusive OR gate receives from latch 9-9, and the output signal from that exclusive OR gate is a logical zero, thus causing the $\overline{EOD}$ signal from NAND gate 9-10 to be a logical one, indicating that an EOD character has not been transferred on bus 111a.

In a similar manner, latch 9-11, exclusive OR array 9-2d, and NAND gate 9-12 provide an $\overline{EOC}$ signal on terminal 9-12a which indicates whether an end of chapter (EOC) character has been transferred on bus 111a. Thus, for example, if an EOC character is hexadecimal FE (binary 11111110), prior to the textual comparison process, programming logic 116 provides a data signal D7 through D0 equal to 00000001, and causes this signal to be stored in latch 9-11 by providing an A2 through A0 address signal of 001 which, together with appropriate enabling signals E1 through E3, in turn is applied to decoder 9-18, which in turn provides a positive going CLK 9-1 signal which is applied to latch 9-11. In this manner, when textual data is transferred from mass storage device 111 (FIG. 8) to bus 111a, each textual character is compared by exclusive OR gate array 9-2d with the data stored in latch 9-11, and an $\overline{EOC}$ signal is made available on output terminal 9-12a indicating whether an EOC character has been transmitted on bus 111a.

In a similar manner, latch 9-13, exclusive OR array 9-2e, and NAND gate 9-14 provide an $\overline{EOT}$ signal on terminal 9-14a which indicates whether an end of chapter (EOT) character has been transferred on bus 111a. Thus, for example, if an EOT character is hexadecimal FD (binary 11111101), prior to the textual comparison process, programming logic 116 provides a data signal D7 through D0 equal to 00000010, and causes this signal to be stored in latch 9-13 by providing an A2 through A0 address signal of 010 which, together with appropriate enabling signals E1 through E3, in turn is applied to decoder 9-18, which in turn provides a positive going CLK 9-2 signal which is applied to latch 9-13. In this manner, when textual data is transferred from mass storage device 111 (FIG. 8) to bus 111a, each textual character is compared by exclusive OR gate array 9-2e with the data stored in latch 9-13 and an EOT signal is made available on output terminal 9-14a indicating whether an EOT character has been transmitted on bus 111a.

Naturally, for data base systems which utilize special characters to indicate EOW, EOS, and EOP, circuitry analogous to latch 9-9, exclusive OR gate array 9-2c, and NAND gate 9-10 may be used in a similar manner as these circuit elements are used to detect an EOD character. Furthermore, the programming leads of exclusive OR gate arrays 9-2a and 9-2b need not be hard wired to logical zero or logical one signals, but rather could be wired to output signals available from a memory device, if desired. Still further, one or more of latches 9-9, 9-11, and 9-13 can be replaced by hard wiring the programming input leads of exclusive OR gate arrays 9-2c, 9-2d, and 9-2e, respectively, to appropriate logical zero and logical one signals, although, as previously described, by utilizing latches 9-9, 9-11, and 9-13, the delimiter logic 113 of FIG. 9 can be utilized with any data base, regardless of the specific character which that data base uses as an EOD, EOC, and EOT character.

Word Logic 112

Figure 12:
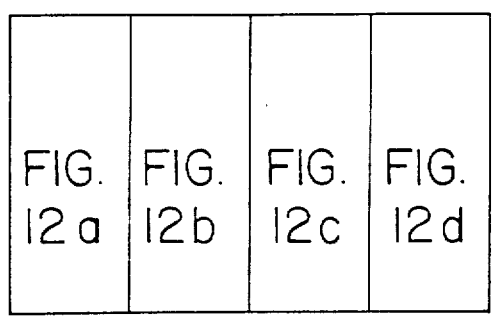
FIG. 12 is a diagram depicting the relationship between FIGS. 12a-12d which in turn form a schematic diagram of the word logic 112 shown in FIG. 8.

Referring to FIG. 12, the operation of word logic 112 will now be described. FIG. 12 depicts a portion of word logic 112 which is capable of detecting a predefined string of up to eight characters. Although not shown in FIG. 12, word logic 112 includes a latch (such as a 74373 device manufactured by National) provided between mass storage device 111 (FIG. 8) and bus 111a, in order to store data output from mass storage device 111 and provide this data to the remainder of word logic 112 until the next data word has been made available by mass storage device 111. Naturally, other embodiments of this invention will become readily apparent to those of ordinary skill in the art in light of the teachings of this specification which will allow character strings of more than (or, if desired, less than) eight characters to be detected. It is also to be understood that word logic 112 typically comprises a plurality of the type of circuits shown in FIG. 12, in order that a plurality of character strings may be detected simultaneously. Thus, for example, in this embodiment word logic 112 contains a plurality of sixteen circuits of the type shown in FIG. 12, and thus a plurality of sixteen separate character strings, each character string comprising as many as eight characters, may be detected simultaneously as character data is transferred from mass storage device 111 on bus 111a. Since each such circuit contained within word logic 112 is identical, the description of one such circuit as shown in FIG. 12 will fully describe the operation of word logic 112.

By way of example, assume that it is desired to locate each occurrence of the word "knife" within the character data stored in mass storage device 111 (FIG. 8). Because this embodiment of word logic 112 is capable of detecting up to sixteen character strings simultaneously, "knife" will be referred to as word ∅ or W∅ to distinguish from other words being detected. First, the circuit of FIG. 12 is programmed in order to be able to detect each occurrence of the word "knife." To do this, programming logic 116 (FIG. 8) sequentially stores within each character latch 17-0 through 17-7 a binary signal corresponding to the inverse of the binary signal representing each letter of the word "knife." Thus, programming logic 116 provides on bus 111a address signals A4 through A0 of 0000, together with suitable enabling signals (not shown) to enable decoder 16. These address signals are applied to decoder 16 which comprises, for example, a 74154 manufactured by National. In response to this 0000 address signal, decoder 16 provides a positive going chip enable 0 (CE0) signal, which is applied to character latch 17-0, thus causing the data bits D7 through D0 provided on bus 111a by programming logic 116 to be stored in latch 17-0. Because the letter "k" is depicted in ASCII as a binary 01101011, programming logic 116 provides a D0 through D7 signal on bus 111a of 10010100, which is stored in character latch 17-0.

Next, programming logic 116 provides an address signal A4 through A0 of 0001, which, together with suitable enabling signals, cause decoder 116 to provide a positive going CE1 signal which is applied to character latch 17-1, thus causing character latch 17-1 to store the D7 through D0 signal provided by programming logic 116. At this time, programming logic 116 provides a D7 through D0 signal of 10010001, the inverse of the binary signal 01101110 which denotes the letter "n" in ASCII. In a similar manner, programming logic 116 sequentially generates address signals which, together with suitable enabling signals, cause decoder 16 to provide positive going CE2 through CE7 signals, thereby causing data words provided by programming logic 116 to be stored in character latches 17-2 through 17-7, respectively. Since the selected word is "knife", the data which is stored in character latch 17-2 is a binary 10010110, corresponding to the inverse of the binary representation of the ASCII letter "i". The data stored within character latch 17-3 is a binary 10011001, (the inverse of the letter "f"), and the data stored within character latch 17-4 is a binary 10011010 (the inverse of the letter "e"). Because the word "knife" contains only five letters, it is unimportant what is stored in character latches 17-5 through 17-7, as the presence or absence of the characters detected by character latches 17-5 through 17-7 and their associated components will be masked by NAND gates 22-5 through 22-7, respectively, in order to have no effect on the $\overline{WORD\emptyset}$ output signal provided on output lead 112a-0. Output lead 112a-∅0 comprises one of the sixteen leads (leads 112a-1 through 112a-15 not shown) forming bus 112a. Leads 112a-0 through 112a-15 provide word signals $\overline{WORD\emptyset}$ ($\overline{W\emptyset}$) through WORD15 ($\overline{W15}$), respectively.

The masking of unneeded characters is provided as follows. After loading the required data into latches 17-0 through 17-7, programming logic 116 sets onto bus 111a an eight bit data word which defines which characters are to be masked by NAND gates 22-0 through 22-7. This eight bit mask word is stored in latch 20 (which may comprise, for example, a 74374 manufactured by National) in response to the CE8 signal from decoder 16, which is generated in response to appropriate signals from programming logic 116. Because "knife" contains only five characters, the eight bit mask provided by programming logic 116 and stored in latch 20 is a binary 00011111, indicating that the three characters detected by character latches 17-5 through 17-7 and their associated components are to be masked.

After the programming of the character latches 17-0 through 17-7 and the masking latch 20 of the $\overline{WORD\emptyset}$ circuit of FIG. 12, the character latches and masking latches of the WORD1 through WORD15 circuits are programmed in a similar manner in order to allow these WORD1 through WORD15 circuits to detect additional words simultaneously with the WORD∅ circuit detecting occurrences of the word "knife".

Mass storage device 111 then transfers its contents on a character-by-character basis to bus 111a. Each data bit D7 through D0 of each character transferred onto bus 111a is applied to one input lead of a plurality of eight exclusive OR gates, each such exclusive OR gate being associated with one character latch 17-0 through 17-7. Thus, the D0 bit is applied to one input lead of exclusive OR gate 18-0a associated with character latch 17-0, one input lead of exclusive OR gate 18-1a associated with character latch 17-1, ... and one input lead of exclusive OR gate 18-7a associated with character latch 17-7. The remaining input lead of each exclusive OR gate receives the appropriate bit from its associated character latch 17-0 through 17-7. Thus, exclusive OR gate 18-0a receives the D0 signal from bus 111a and the least significant bit stored in character latch 17-0. Similarly, exclusive OR gate 18-0b receives the D1 signal from bus 111a, and the second least significant bit stored in character latch 17-0, etc. Because character latch 17-0 stores the binary inverse of the first character "k" to be detected, when the character "k" is set onto bus 111a, each exclusive OR gate 18-0a through 18-0h receives complementary input signals (i.e., one input signal is high, and the other input signals is low), and thus the output signal from each exclusive OR gate 18-0a through 18-0h is a logical one, which are in turn applied to the input leads of NAND gate 19-0, thus providing a logical zero $\overline{k}$ output signal from NAND gate 19-0. Conversely, if a character other than a "k" is set onto bus 111a, at least one exclusive OR gate 18-0a through 18-0h receives identical signals on its input leads i.e. either both logical zero or both logical one), and thus that exclusive OR gate generates a logical zero output signal which causes NAND gate 19-0 to provide a logical one $\overline{k}$ output signal, indicating that the character "k" has not been detected.

In a similar manner, the remaining character latches 17-1 through 17-4, and their associated exclusive OR gates and NAND gates, provide logical zero $\overline{n}$, $\overline{i}$, $\overline{f}$ and $\overline{e}$ signals on the output lead of NAND gates 19-1 through 19-4 when the characters "n", "i", "f", and "e", respectively, are detected. At all other times, the signals on the output lead of NAND gates 19-1 through 19-4 are logical one.

The output signals from NAND gates 19-0 through 19-7 are applied to one input lead of masking NAND gates 22-0 through 22-7, respectively. Masking NAND gates 22-0 through 22-7 mask the detected character signals provided by NAND gates 19-0 through 19-7 in accordance with the masking word stored within masking latch 20. The least significant bit stored in masking latch 20 is applied to the other input lead of NAND gate 22-0, the second least significant bit stored within that masking latch 20 is applied to the other input lead of NAND gate 22-1, etc., and the most significant bit stored in masking latch 20 is applied to the other input lead of NAND gate 22-7. Because the three most significant bits stored in masking latch 20 are zeroes, and these logical zeroes are applied to one input lead of NAND gates 22-5 through 22-7, NAND gates 22-5 through 22-7 always provide logical one signals on their output leads. Thus, even though the output signals from NAND gates 19-5 through 19-7 are applied to one input lead of NAND gates 22-5 through 22-7, respectively, these signals from NAND gates 19-5 through 19-7 have no effect on the output signals provided by NAND gates 19-5 through 19-7. Conversely, because the five least significant bits stored in masking latch 20 are logical ones, the output signals provided by NAND gates 22-0 through 22-4 will be the inverse of the signals provided by NAND gates 19-0 through 19-4, respectively. Thus, when the character "k" is set onto bus 111a, NAND gate 19-0 provides a logical zero $\bar{k}$ signal to one input lead of NAND gate 22-0, which in turn provides a logical one k output signal. In a similar manner, when the letter "n" is set onto bus 111a, NAND gate 22-1 provides a logical one n output signal; when the character "i" is set onto bus 111a, NAND gate 22-2 generates a logical one i output signal; when the character "f" is set onto bus 111a, NAND gate 22-4 generates a logical one f output signal; and when the character "e" is set onto bus 111a, NAND gate 22-5 generates a logical one e output signal. As previously described, NAND gates 22-5 through 22-7, corresponding to the detection of characters which are not of interest when searching for the character string "knife", always provide logical one output signals.

The output signals from NAND gates 22-0 through 22-7 are applied to the input leads of shift registers 23-0 through 23-7, respectively. Shift register 23-0 is an eight bit shift register, shift register 23-1 is a seven bit shift register, shift register 23-2 is a six bit shift register, etc., and shift register 23-7 is a one bit shift register. Shift registers 23-0 through 23-7 are formed, for example, by the appropriate connection of a plurality of 74174 hex D-type flip flops manufactured by National. Shift registers 23-0 through 23-7 each receive a clock signal on input lead 23-7a which is provided by mass storage device 111 (FIG. 8) on bus 111a, indicating that a valid data character is present on bus 111a. The signals provided by NAND gates 22-0 through 22-7 are received by shift registers 23-0 through 23-7, and the content of each shift register 23-0 through 23-7 is shifted to the next most significant bit within that shift register upon receipt of each clock signal on lead 23-7a. In this manner, the output signals as provided by shift registers 23-0 through 23-7 depict the positional relationship of the detected characters.

In order to provide a logical zero $\overline{WORD\emptyset}$ signal indicating when the word "knife" is detected, and provide a logical one $\overline{WORD\emptyset}$ signal when the word "knife" is not detected, shift registers 23-0 through 23-7 are used. In this example, the character string "knife☐☐☐" is to be detected, where each "☐" indicates a "don't care" character. To detect the character string "knife☐☐☐", the most recently detected character must be a "don't care" character, the second most recently detected character must also be a "don't care" character, the third most recently detected character must be a "don't care" character, the fourth most recently detected character must be the letter "e", the fifth most recently detected character must be an "f", the sixth most recently detected character must be an "i", the seventh most recently detected character must be an "n", and the eighth most recently detected character must be a "k". Accordingly, since the character "k" must be the eighth most recently detected character, the output signal from NAND gate 22-0, indicating when the character "k" has been detected, is applied to 8 bit shift register 23-0. Similarly, since the letter "n" must be the seventh most recently detected character, the output signal from NAND gate 22-1, which indicates when the letter "n" has been detected, is applied to the input lead of seven bit shift register 23-1, etc. When the proper sequence of characters have been detected which spell "knife☐☐☐" the output signal from each shift register 23-0 through 23-7 is a logical one, which in turn is applied to the input leads of NAND gate 23-8, thus causing NAND gate 23-8 to provide a logical zero $\overline{WORD\theta}$ signal on output lead 112a-0, thus indicating that "knife" has been detected. At all other times, at least one output signal from shift registers 23-0 through 23-7 is a logical zero, thUs causing NAND gate 23-8 to provide a logical one $\overline{WORD\emptyset}$ signal on output lead 112a-0, thus indicating that "knife" has not been detected It is apparent to those of ordinary skill in the art in light of the teachings of this specification that, if desired, word logic 112 can be programmed such that programming latches 17-0 through 17-7 and their associated components detect the character string "☐☐☐knife", rather than "knife☐☐☐" as described above. In this event, the masking word stored in masking latch 20 will be 11111000, indicating that the three characters detected by character latches 17-0 through 17-3 and their associated components are to be masked by NAND gates 22-0 through 22-3, respectively. In this embodiment, where the "don't care" characters precede the characters to be detected, the $\overline{WORD\theta}$ signal goes low upon receipt of the last character in the character string being detected, rather than j characters later, where j is the number of "don't care" characters in the character string being detected (i.e., j=3 for "☐☐☐knifes").

It is also apparent to those of ordinary skill in the art in light of the teachings of this specification that, if desired, word logic 112 can be programmed such that the programming latches 17-0 through 17-7 and their associated components detect the character string "efink☐☐☐". In this event, the masking words stored in masking latch 20 will be 00000111, indicating that the three characters detected by character latches 17-5 through 17-7 and their associated components are to be masked by NAND gates 22-5 through 22-7, respectively. In this event, however, shift register 23-0 is a one bit shift register, shift register 23-1 is a two bit shift register, shift register 23-2 is a three bit shift register, etc., and shift register 23-7 is an eight bit shift register.

It is also apparent to one of ordinary skill in the art in light of the teachings of this specification that, if desired, word logic 112 can be programmed such that programming latches 17-0 through 17-7 and their associated components detect the characters string "☐☐☐efink". In this event, the masking word stored in masking latch 20 will be 11100000, indicating that the characters detected by character latches 17-0 through 17-2 and their associated components are to be masked by NAND gates 22-0 through 22-2, respectively. In this event, shift register 23-0 is a one bit shift register, etc., and shift register 23-7 is an eight bit shift register.

If it is desired to detect the occurrence of either upper case or lower case letters, the sixth least significant bit received from mass storage device 111 is held high and the word latches 17-0 through 17-6 are loaded with data to cause the detection of upper case letters forming the desired word. Alternatively, the sixth least significant bit received from mass storage device 111 is held low, and the word latches 17-0 through 17-6 are loaded with data to cause the detection of lower case letters forming the desired word. In either event, both upper and lower case letters will be detected by latches 17-0 through 17-6 and their associated components, as the sixth least significant bit, which distinguishes between upper and lower case, is effectively masked. In another embodiment of this invention, the output signals from the sixth least significant exclusive nor gates 18-0$b$, 18-1$b$, . . . 16-6$b$, are held high, thereby effectively masking the sixth least significant bit and thus providing output signals when either upper or lower case letters are detected.

Set Logic 114

Figure 10:
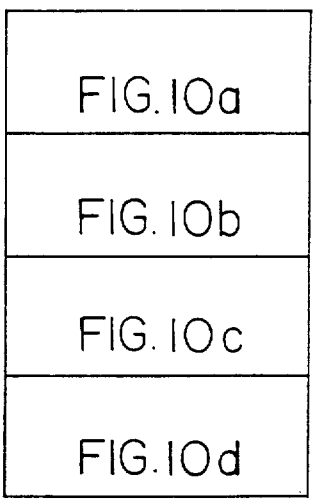
FIG. 10 is a diagram depicting the relationship between FIGS. 10a-10d which in turn form a schematic diagram of the set logic 114 depicted in FIG. 8.

FIGS. 10$a$ through 10$d$ form a schematic diagram of set logic 114. Although not shown in FIG. 10, set logic 114 includes a latch (such as a 74373 device manufactured by National) provided between mass storage device 111 (FIG. 8) and bus 11$a$, in order to store data output from mass storage device 111 and provide this data to the remainder of set logic 114 until the next data word has been made available by mass storage device 111. Set logic 114 serves to determine when a set of selected words are detected within the same sentence, paragraph, document, etc., as defined by the user's search strategy. For example, that portion of set logic 114 shown in FIG. 10$a$ detects when a predefined set of words 0 through 3 (i.e., a user defined set of $\overline{W0}$ through $\overline{W3}$ signals generated by word logic 112 (shown in FIGS. 8 and 12) are detected within the same sentence or paragraph, etc. As previously described, the $\overline{W0}$ through $\overline{W3}$ signals are provided by word decode logic 112 (FIG. 12). Set logic 114 as shown in FIG. 12 is capable of receiving sixteen word signals (i.e., $\overline{W0}$ through $\overline{W15}$, although it is apparent to one of ordinary skill in the art in light of the teachings of this specification that set logic 114 can be constructed to operate on any desired number of words which are each detected, for example, by a unique one of an equal number of circuits as shown in FIG. 12 which form word logic 112. Furthermore, as will now be fully described, set logic 114 is capable of forming a plurality of sets, each set being generated by a plurality of four words. It is readily apparent to one of ordinary skill in the art in light of the teachings of this specification that set logic 114 can be constructed in order to form any desired number of sets, each set being generated in response to any desired number of words. Because the embodiment of set logic 114 depicted in FIG. 10 is formed of four substantially identical subcircuits (one such subcircuit being substantially shown in each of FIGS. 10$a$ through 10$d$), the following description of the operation of the subcircuit of FIG. 10$a$ is sufficient to describe the operation of the entire set logic 114 depicted in FIG. 10$a$ through 10$d$.

Referring to FIG. 10$a$, leads 9-1$a$ through 9-1$h$ are connected to bus 111$a$ to receive the data signals D0 through D7, respectively. The delimiter signals (EOT, EOC, EOD, EOP, EOS, and EOW) are received from delimiter logic 113 (FIGS. 8 and 9) on bus 113$a$. The $\overline{W0}$ through $\overline{W3}$ signals are received from appropriate portions of word logic 112 (FIGS. 8 and 12) and applied to the $\overline{SET}$ $\overline{3}$ input leads of $\overline{SR}$ latches 10-7$a$ through 10-7$d$ respectively. Latches 10-7$a$ through 10-7$d$ serve to store data indicating when words 0 through 3, respectively, have been detected by word logic 112. $\overline{SR}$ latches 10-7$a$ through 10-7$d$ each comprise, for example, one of the four latches contained within a DM74279 device manufactured by National.

Multiplexer 10-3 selects the appropriate delimiter signal or ground, (as will be fully described later) and in response thereto, provides a $\overline{RESETA}$ signal which is applied to the $\overline{RESET}$ input leads of latches 10-7$a$ through 10-7$d$, causing latches 10-7$a$ through 10-7$d$ to be reset to store logical zeros when the $\overline{RESETA}$ signal is a logical zero. Multiplexer 10-3 comprises, for example, a 74151 device manufactured by National. Latch 10-1 stores information provided by programming logic 116 (FIG. 8) on bus 111$a$ during the programming of the text comparator prior to executing a textual search strategy. Latch 10-1 comprises, for example, a 74374 device manufactured by National.

Latch 10-8 (for example a 74374 device) serves to store masking information which is provided by programming logic 116 (FIG. 8) to latch 10-8 via bus 111$a$ during the programming of the text comparator of this invention prior to the execution of a user-defined textual comparison search strategy. Logical AND circuitry 10-36 combines the $\overline{W0}$ through $\overline{W3}$ signals in a logical AND and a logical NAND fashion and provides the $\overline{SET1AND}$ (S2AND) and the $\overline{SET2AND}$ (S1AND) signals on leads 10-14$a$ and 10-16$a$, respectively. Similarly, the logical OR circuitry 10-37 combines the $\overline{W0}$ through $\overline{W3}$ signals in a logical OR and a logical NOR fashion and provides the SET1OR (S1OR) and the SET1OR ($\overline{S1OR}$) signals on leads 10-13$a$ and 10-15$a$, respectively. Logical AND circuitry 10-36 and logical OR circuitry 10-37, when masked by the masking data stored in masking latch 10-8, provide output signals which indicate whether the words 0 through 3 have been detected between two occurrences of the signal selected by decoder 10-3, thereby providing output signals indicating whether words 0 through 3 have been detected in the same sentence, for example.

In order to program set logic 114, programming logic 116 (FIG. 8) first sets onto the D0 through D7 data lines of bus 111$a$ the information which is to be stored in latch 10-1. Programming logic 116 then provides the appropriate A0 through A2 and E1 through E3 signals, thereby causing multiplexer 9-18 (FIG. 9$a$) to generate a positive going CLK10-1 signal, which is applied to latch 10-1, thereby causing the D0 through D7 data on bus 111$a$ to be stored within latch 10-1. The three least significant bits stored in latch 10-1 are applied to the address input leads of multiplexer 10-3, and similarly the next three least significant bits stored in latch 10-1 are applied to the address input leads of multiplexer 10-4. The three address signals applied to multiplexer 10-3 define which delimiter signal (or ground, if the input lead of multiplexer 10-3 which is connected to ground, as shown, is selected by multiplexer 10-4 in response to the address signals provided thereto by latch 10-1) is to generate the $\overline{\text{RESETA}}$ signal on the output lead of multiplexer 10-3. Ground is selected by multiplexor 10-3 in order to generate a $\overline{\text{RESETA}}$ signal when desired to reset the contents of flip-flops 10-7a through 10-7d, for example on power-up of the set logic 114. Next, programming logic 116 (FIG. 8) sets onto the D0 through D7 data leads of bus 111a the masking data which is to be stored in masking latch 10-8. Programming logic 116 then sets onto bus 111a the A0 through A2 and the E1 through E3 signals which cause demultiplexer 9-18 (FIG. 9a) to generate a positive going CLK10-2 signal, which in turn is applied to latch 10-8, thereby causing the data on leads D0 through D7 of bus 111a to be stored in latch 10-8. If required by the user defined search strategy, programming logic 116 then repeats these steps in order to program the remaining latches 10-2, 10-9, 10-10, and 10-11 of set logic 114.

Assume, for example, that it is desired to locate within the textual information stored in mass storage device 111 all instances where the word "knife" (WORD0) occurs within the same sentence as the word "blood" (WORD1). Programming logic 116 programs word logic 112 as previously described, to cause WORD0 to be the word "knife" and WORD1 to be the word "blood", thus causing a low $\overline{\text{W0}}$ signal and a low $\overline{\text{W1}}$ signal to be generated upon detection of the words "knife" and "blood", respectively. Because it is desired to locate these two words only within the same sentence, the latches 10-7a through 10-7d must be reset upon receipt of the EOS delimiter signal. Accordingly, programming logic 116 stores within latch 10-1 three least significant bits which, when applied to the address input leads of multiplexer 10-3, cause multiplexer 10-3 to select the EOS signal applied via bus 113a to generate the $\overline{\text{RESETA}}$ signal. Furthermore, because only WORD0 and WORD1 are of interest in this particular search, programming logic 116 causes to be stored in masking latch 10-8 an eight bit mask which will cause the $\overline{\text{W2}}$ and $\overline{\text{W3}}$ signals to have no effect on the output signals generated by the logical AND logic circuitry 10-36.

Because in this example the words "knife" and "blood" are to be combined a logical AND operation, the output signals from logical OR circuitry 10-37 are not used, and thus the value of the four most significant bits stored in masking latch 10-8 is unimportant. However, in order to cause logical AND circuitry 10-36 to provide S1AND and output signals generated by the logical operation $\text{S1AND} = (\overline{\text{W0}} \text{ AND } \overline{\text{W1}})$ the four least significant bits (D4 through D0) provided by programming logic 116 and stored in latch 10-8 must be equal to 1100, respectively. In this manner, the least significant bit stored in masking latch 10-8 is a logical zero, which is applied to one input lead of NOR gate 10-12h. With a logical zero signal applied to one input lead of NOR gate 10-12h, the other input lead of NOR gate 10-12h, which is connected to the Q output lead of flip flop 10-7a, controls the output signal from NOR gate 10-12h. Similarly, with the second least significant bit being a logical zero, which is applied to one input lead of NOR gate 10-12g, the other input lead of NOR gate 10-12g, which is connected to the Q output lead of flip flop 10-7b, causes NOR gate 10-12g to generate its output signal in response to the W1 signal stored in flip flop 10-7b. Because the third and fourth least significant bits stored in masking latch 10-8 are logical ones and are each applied to one input lead of NOR gates 10-12f and 10-12e, respectively, NOR gates 10-12e and 10-12f always provide logical zero- output signals, indicating that the W2 and W3 signals stored in latches 10-7c and 10-7d, respectively (and thus WORD2 and WORD3) are unimportant and form no part of the logical operation performed by logical AND circuitry 10-36.

The output signals from NOR gates 10-12e through 10-12h are applied to the input leads of NOR gate 10-14. Because the output signals from NOR gates 10-12e and 10-12f are always a logical zero, they will have no effect on the output signal generated by NOR gate 10-14. However, only when the output signals generated by NOR gates 10-12g and 10-12h are logical zeros, indicating that logical ones are stored in both shift registers 10-7a and 10-7b (i.e., logical zero $\overline{\text{W0}}$ and $\overline{\text{W1}}$ signals have been received and thus logical one W0 and W1 signals stored in flip flops 10-7a and 10-7b, respectively, since the last $\overline{\text{RESETA}}$ signal) will the S1AND output signal from NOR gate 10-14 be a logical one, indicating that the words "knife" and "blood" have both been located in a single sentence.

As previously described, the $\overline{\text{RESETA}}$ signal is, in this example, generated by multiplexer 10-3 in response to the EOS signal. Accordingly, the data stored in latches 10-7a and 10-7d is reset to logical zeros in response to a logical zero $\overline{\text{RESETA}}$ signal. If after a logical zero $\overline{\text{RESETA}}$ signal the word "knife" is detected, a logical zero $\overline{\text{W0}}$ signal is applied to the $\overline{3}$ input lead of flip-flop 10-7a, thus causing a logical one to be stored in flip flop 10-7a. This generates a logical one Q output signal from flip-flop 10-7a which is applied to one input lead of NOR gate 10-12h, thus causing NOR gate 10-12a to generate a logical zero output signal. However, because the word "blood" (WORD1) has not been detected, a logical zero is still stored in shift register 10-7b, and shift register 10-7b provides a logical zero Q output signal which is applied to one input lead of NOR gate 10-12g. This, together with the logical zero input signal applied to its other input lead from latch 10-8, causes NOR gate 10-12g to provide a logical one output signal, thus causing NOR gate 10-14 to generate a logical zero SET1AND output signal, indicating that the words "knife" and "blood" have not both been detected in the same sentence. If an EOS signal is now generated prior to the detection of the word "blood" multiplexer 10-3 generates a logical zero $\overline{\text{RESETA}}$ signal and the shift registers 10-7a through 10-7d are reset to store logical zeros, thereby preventing an erroneous output signal from logical AND circuitry 10-36 should the word "blood" be detected in a subsequent sentence which does not also contain the word "knife".

In a similar manner, if the search strategy requires the location of all occurrences of either the word "knife" or "blood" in the same sentence, the logical OR circuitry 10-37 is utilized. In this event, the four most significant masking bits stored in masking latch 10-8 by programming logic 116 are 0011. With the most significant bit from masking latch 10-8 being applied to one input lead of NAND gate 10-12a, NAND gate 10-12a always generates a logical one output signal, and thus the W3 signal stored in shift register 10-7d has no effect on the output signals generated by OR logic circuitry 10-37. Similarly, because the second most signficant masking bit stored in masking latch 10-8 is applied to one input lead of NAND gate 10-12b, NAND gate 10-12b always generates a logical one output signal, and thus the W2 signal stored in shift register 10-7c has no effect on the output signal generated by logical OR circuitry 10-37. The third and fourth most significant masking bits stored in masking latch 10-8 are logical ones, and are applied to one input lead of NAND gates 10-12c and 10-12d, respectively. These logical one signals cause the output signals from NAND gates 10-12c and 10-12d to be generated in response to the W0 and W1 signals stored in flip-flops 10-7a and 10-7b, respectively, and applied to the other input lead of NAND gates 10-12d and 10-12c, respectively. If the word "knife" is detected, a logical zero W0 signal is generated by word logic 112, and thus a logical one $\overline{W0}$ signal is stored in flip-flop 10-7a. This logical one W0 signal causes NAND gate 10-12d to generate a logical zero output signal which causes NAND gate 10-13 to generate a logical one S1OR signal on output lead 10-13a (and causes inverter 10-5 to generate a logical zero $\overline{S1OR}$ signal on output lead 10-15a), thus indicating that the word "knife" has been detected. Similarly, if the word "blood" is detected, a logical zero $\overline{W1}$ signal is generated by word logic 112 and thus a logical one W1 signal is stored in flip flop 10-7b. This logical one W1 signal causes NAND gate 10-12c to generate a logical zero output signal, which in turn causes NAND gate 10-13 to generate a logical one S1OR signal on output lead 10-13a (and causes inverter 10-15 to generate a logical zero S1OR 2 signal on output lead 10-15a), thus indicating that the word "blood" has been detected. If neither the word "knife" or the word "blood" is detected, flip flops 10-7a-through 10-7d will each store a logical zero signal, NAND gates 10-12a through 10-12d each generate logical one output signals, NAND gate 10-13 generates a logical zero S1OR signal, and inverter 10-15 generates a logical one $\overline{S1OR}$ signal), thus indicating that neither "knife" or "blood" has been detected.

Set Combination Logic 115

Figure 11:
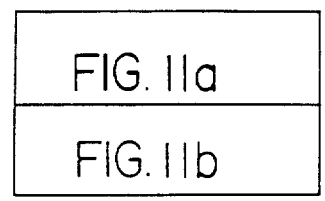
FIG. 11 is a diagram which depicts the relationship between FIGS. 11a and 11b which in turn form a schematic diagram of the set combination logic 115 depicted in FIG. 8.

Set combination logic 115 serves to combine the set signals provided by set logic 114 (FIG. 10) in accordance with a user defined search strategy. Although not shown in FIG. 11, set combination logic 115 includes a latch (such as a 74373 device manufactured by National) provided between mass storage device 111 (FIG. 8) and bus 111a, in order to store data output from mass storage device 111 and provide this data to the remainder of set combination logic 115 until the next data word has been made available by mass storage device 111. Set combination logic 115 includes latches 11-2 and 11-3 (which comprise, for example 74374 devices manufactured by National) which store set combination words provided by programming logic 116 in response to the user defined search strategy. Latches 11-2 and 11-3 store this information in response to the CLK11-6 and CLK11-7 signals, respectively, generated by decoder 9-17 (FIG. 9), as previously described. Set combination logic 115 also includes $\overline{RS}$ flip-flops 11-1a through 11-1h which comprise, for example, 74279 devices manufactured by National. Shift registers 11-1a through 11-1h store the $\overline{SOOR}$, $\overline{S1AND}$ through $\overline{S3OR}$, $\overline{S3AND}$ signals provided by set logic 114 (FIG. 10). Flip-flops 11-1a through 11-h are reset by reset signal 11a provided by programming logic 116 (FIG. 8) when a search strategy is begun.

Latch 11-2 stores the masking word provided by programming logic 116, in order to cause NAND gates 11-2a through 11-2h and their associated components to combine the set signals stored in flip flops 11-1a through 11-1h in a logical OR function. For example, if it is desired to combine the $\overline{SOOR}$ and $\overline{SOAND}$ signals, programming logic 116 (FIG. 8) causes latch 11-2 to store D7 through D0 signals of 00000011, where the logical ones indicate which set signals are to be combined in the logical OR function. Thus, latch 11-2 provides logical zero signals to one input lead of NAND gates 11-2a through 11-2f, thereby causing the output signals from these NAND gates 11-2a through 11-2f to be logical ones. Latch 11-2 also provides logical one signals to one input lead of NAND gates 11-2g and 11-2h. The other input leads of NAND gates 11-2g and 11-2h are connected to the output leads of flip flops .p and 11-1b, respectively. Prior to the $\overline{SOORA}$ and $\overline{SOAND}$ signals going low, the Q output signals from flip-flops 11-1a and 11-1b are logical zero, thus causing the output signals from 11-2g and 11-2h to be logical ones. This causes the output signal from NAND gate 11-3 to be logical zero, and the output signal from inverter 11-4 -to. be logical one. Thus, only when a logical zero $\overline{SOOR}$ signal or $\overline{SOAND}$ signal has been generated by set logic 114 (Fig. 10), will the Q output signal from flip-flops 11-1a or 11-1b be a logical one, thereby causing the output signal from NAND gates 11-2g and 11-2h to be a logical zero. With one input signal to NAND gate 11-3 a logical zero, the output signal from NAND gate 11-3 is a logical one, indicating that the logical OR combination of the set signals defined by the masking word stored in latch 11-2 has been met. This logical one signal from NAND gate 11-3 causes the output signal from inverter 11-4 to be a logical zero, thereby causing the output signal from NAND gate 11-9 to be a logical one. Q In a similar manner, latch 11-3 stores a masking word provided by programming logic 116 in order to combine the set signals applied to flip flops 11-1a through 11-1h to be combined in a logical AND- fashion. Thus, if it is desired to combine the $\overline{SOOR}$ signal with the $\overline{SOAND}$ signal in a logical AND function, latch 11-3 is programmed by programming logic 116 (FIG. 8) to store D7 through D0 signals 11111100. With logical ones applied to one input lead of NOR gates 11-5a through 11-5f, the output signals from these NOR gates are logical zeroes. With logical zero signals applied by latch 11-3 to one input lead of NOR gates 11-5g and 11-5h, the output signals from NOR gates 11-5g and 11-5h will be logical zero only when both the and $\overline{SOOR}$ and $\overline{SOAND}$ signals have been logical zero, thus causing logical one Q signals to be provided by both flip-flops 11-1a and 11-1b, respectively. With the output signal from both NOR gates 11-5g or 11-5h logical zeros, the output signal from NOR gates 11-7 is logical one, and the output signal from NAND gate 11-8 is a logical zero, indicating that both SOOR and SOAND has been low. This causes the output signal from NAND gate 11-9 to be a Thus, a logical one on the output lead of NAND gate 11-9 indicates that either the logical OR function provided by latch 11-2 and its associated components or the logical AND function provided by latch 11-3 and its associated components, has been met. This logical one output signal from NAND gate 11-9 is available on lead 115a-1 to provide an interrupt signal to a central processing unit (CPU, not shown) if desired. This interrupt signal can be inverted by an inverter (not shown) if desired. This logical one output signal from NAND gate 11-9 also provides a clock signal to latch 11-10 and which comprises, for example a 743734 device manufactured by National), thus causing the Q output signals from flip flops 11-1a through 11-1h to be stored in latch 11-10. Terminal 11-10a receives an output enable signal from the central processing unit, thereby causing the bits stored in latch 11-10 which indicate the status of the set signals received and stored within flip-flops 11-1a through 11-1h, to be set onto bus 111a for use by the central processing unit, if desired.

Proximity Logic 117

Figure 13:
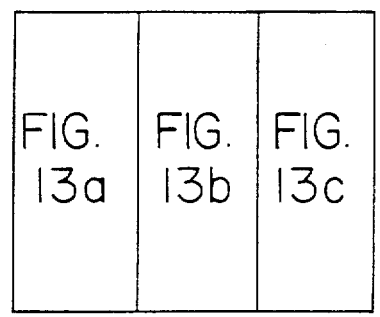
FIG. 13 is a diagram depicting the relationship between FIGS. 13a-13c which in turn form a schematic diagram of the proximity logic 117 shown in FIG. 8.

Referring to FIG. 13, the operation of proximity logic 117 will now be described. Proximity logic 117 includes a latch (such a 74373 device manufactured by National) provided between mass storage device 111 (FIG. 8) and bus 111a, in order to store data output from mass storage device 111 and provide this data to the remainder of proximity logic 117 until the next data word has been made available by mass storage device 111a. Proximity logic 117 serves to detect when a first selected word (detected by word logic 112 of FIG. 12) or set (detected by set logic 114 of FIG. 10) is located within a specific distance or proximity of a second selected word or set. For example, proximity logic 117 can be programmed to detect when a first word "knife" (detected by word logic 112 as, for example, word zero) is located within n words of a second selected word "blood" (detected by word logic 112 a, for example, word four), wherein n is a selected integer ranging from −7 to 7. Naturally, it is apparent to those of ordinary skill in the art in light of the teachings of this specification that alternative embodiments of proximity logic 117 can be constructed which will allow selection from a greater number of words or sets, and where the range of proximities can be any desired number including numbers greater than 7. Furthermore, proximity logic 117 allows detection of words or sets within a plurality of n delimiter characters. Thus, proximity logic 117 is capable, for example, of detecting when a first selected word or set is located within n sentences, paragraphs, documents, etc., of a second selected word or set.

The operation of the embodiment of proximity logic 117 shown in FIG. 13 is as follows. Proximity logic 117 includes latches 13-2 and 13-5 which are programmed by programming logic 116 to store address bits which in turn are applied to decoders 13-3 and 13-4, respectively which cause decoders 13-3 and 13-4 to select which delimiter signal will provide clock signals CLK 13-1 and CLK 13-2, respectively. Latches 13-2 and 13-5 comprise, for example, 74374 devices manufactured by National. Latch 13-2 is programmed by programming logic 116 setting onto bus 111a the desired word to be stored, and appropriate address signals which cause decoder 16 (FIG. 12) to generate a CE9 signal. Latch 13-5 is then programmed by programming logic 116 setting onto bus 111a the desired bits to be stored within latch 13-5, and appropriate address signals A3 through A0 to cause decoder 16 to generate a CE11 signal. Latch CE10 (also a 74374 device) is then programmed in a similar manner to provide address signals to decoders 13-8 and 13-9, which in turn each select one of a plurality of word and set signals for use by proximity logic 117, as will be more fully understood with reference to the following discussion.

The data stored within latch 13-2 also provides three address bits to decoder 13-6, which causes decoder 13-6 to select the appropriate word or set signal to be applied to the input lead of shift register 13-11. In a similar fashion, latch 13-10, which is programmed by programming logic 116 when accessed by a CE10 signal generated by decoder 16 (FIG. 12), provides address signals to decoders 13-8 and 13-9 which selects the appropriate set and word signals for input to shift registers 13-15 and 13-17. Two bits from latch 13-2 and one bit from latch 13-10 serve as address input signals to decoder 13-7, thereby selecting the appropriate word and set signals for input to shift register 13-13. Latches 13-2, 13-5, and 13-10 comprise, for example, 74374 devices manufactured by National. Decoders 13-3, 13-4, 13-6, 13-7, 13-8, and 13-9 comprise, for example 74151 devices manufactured by National.

The operation of shift register 13-11, latch 13-12, and their related components is identical to the operation of shift register 13-13 and latch 13-14, shift register 13-15 and latch 13-16, and shift register 13-17 and latch 13-18, and their related components, and thus only the operation of shift register 13-11 and latch 13-12 and their associated components will be described here. Shift registers 13-11, 13-13, 13-15 and 13-17 comprise, for example 74164 serial in-parallel out shift registers manufactured by National. Latches 13-12, 13-14, 13-16, and 13-18 comprise, for example, 74374 devices manufactured by National. Latch 13-12 is programmed by programming logic 116 in response to a CE12 signal generated by decoder 16 (FIG. 12) in response to the appropriate A3 through A0 signals provided by programming logic 116. Latch 13-12 stores an eight bit proximity word which defines the desired proximity of the words or sets being searched. Shift register 13-11 stores signals representing the relative position of the set or word selected by decoder 151. The bits stored in latch 13-12 indicate which positions within shift register 13-11 are of interest in the search strategy. For example, if it is desired to find word zero within two words of word seven (i.e., "undirected" proximity), programming logic 116 programs latch 13-2 to cause decoder 13-6 to select the $\overline{W0}$ signal, and decoder 13-7 to select the $\overline{W7}$ signal. Furthermore, programming logic 116 programs latch 13-12 to store 00000111, and latch 13-14 to store 00000111. Programming logic 116 programs latch 13-2 to cause decoder 13-3 to select the EOW signal as the CLK13-1 signal, thus causing the W0 and W7 signals selected by decoders 13-6 and 13-7, respectively, to be shifted into shift registers 13-11 and 13-13, respectively, on each EOW signal.

With the four most significant bits of latch 13-12 logical zeroes, NAND gates 13–19a through 13–19e are disabled, thereby providing logical one output signals regardless of the contents of the five most significant bits of shift register 13-11. However, because the three least significant bits stored in latch 13-12 are logical ones, the output signals from NAND gates 13-19f through 13-19h are the logical inverse of the three least significant bits of shift register 13-11. Thus, if a logical one is stored in any of the three least significant bits of shift register 13-11, the output signal from the associated NAND gate 13-19f through 13-19h is a logical zero, thus causing NAND gate 13-23 to generate a logical one output signal. Thus, when both word zero and word seven appear within the last three words decoded (i.e., word zero is within two words of word 7), the output signal from NAND gates 13-23 and 13-24 are both logical ones, and thus the output signal from NAND gate 13-27a is a logical zero, indicating that word zero and word seven have been located within two words of each other.

In a similar manner, NAND gates 13-27b through 13-27h provide output signals based on the appropriate logical combinations of the output signals from NAND gates 13-23 through 13-26. Latch 13-5 also provides three address signals to decoder 13-28 (which comprises, for example, a 74151 device as manufactured by National) which in turn selects the output signals from one of NAND gates 13-27a through 13-27h to provide an interrupt signal on terminal 13-50. This interrupt signal is used to indicate to a central processing unit (not shown) that the text comparator of this invention has detected the occurrence of the desired words or sets of words defined by the search strategy, as defined by the output signal from the NAND gate 13-27a through 13-27h which has been selected by decoder 13-28.

In one embodiment of this invention, proximity logic 117 also includes latch 13-29, which comprises, for example a 74374 device as manufactured by National. Latch 13-29 stores the output signals provided by NAND gates 13-27a through 13-27h, and thereby allows the central processing Q unit (not shown) to determine the value of the signals provided by NAND gates 13-27a through 13-27h at any desired time. In one embodiment of this invention, one eight bit word representing the output signals from NAND gates 13-27a through 13-27h is stored in latch 13-29, and is made available to a central processing unit (not shown) on bus 111a.

Proximity logic 117 is also capable of detecting a so-called "directed" proximity of words or sets of words. In this event, the eight bit proximity word stored in latches 13-12, 13-14, 13-16, and 13-18 will contain only a single logical one bit, thereby causing proximity logic 117 to provide an output signal indicating when a first word or set is located within a precise proximity of a second selected word or set. Thus, for example, proximity logic 117 can be programmed to detect the occurrence of word zero in a location which is exactly n words after the occurrence of word seven, for example, where n is an integer ranging from −7 to +7. Thus, if it is desired to locate the occurrence of word 0 which is precisely four words after word 7, decoder 13-6 selects word 0, decoder 13-7 selects word 7, latch 13-12 stores 00000001, latch 13-13 stores 00010000, and decoder 13-28 selects the output signal from NAND gate 13-27a, thus providing an interrupt signal on output lead 13-50 when word 0 is located exactly four words after word 7.

Alternatively, if it is desired to locate the occurrence of word 0 which is precisely four words before word 7, decoder 13-6 selected word 0, decoder 13-7 selects word 7, latch 13-12 stores 00010000, latch 13-13 stores 00000001, and decoder 13-28 selects the output signal from NAND gate 13-27a, thus providing an interrupt signal on output lead 13-50 when word 0 is located exactly four words before word 7.

Furthermore, if it is desired to locate the occurrence of word 0 which is within four words before word 7 (i.e., word 0 is the first, second, third or fourth word before word 7), decoder 13-6 selects word 0, decoder 13-7 selects word 7, latch 13-12 stores 0011110, latch 13-13 stores 00000001, and decoder 13-28 selects the output signal from NAND gate 13-27a, thus providing an interrupt signal on output lead 13-50 when word 0 is located within four words before word 7.

It is also understood to one of ordinary skill in the art in light of the teachings of this specification, that proximity logic 117 can be constructed to detect the occurrence of greater combinations of words and sets, merely by expanding the number of latches, decoders, and shift registers, and logic gates 13-27a through 13-27h, in order to detect more complex search strategies.

While this specification has explained the operation of this invention in conjunction with several specific embodiments, it is to be understood that this specification is not to operate as a limitation on the scope of the invention. Many other embodiments of this invention will become apparent to those skilled in the art in light of the teachings of this invention.

I claim:

1. A textual comparison system for locating a desired character string within textual material formed from a predefined sequence of characters comprising:
   means for sequentially receiving a plurality of stored textual characters;
   means for sequentially decoding said plurality of stored textual characters as they are received, thereby providing a sequence of decoded characters, said means for decoding including means for being programmed to detect only characters forming a part of said desired character string;
   means for storing said decoded characters and information as to the relative positioning of said decoded characters within said predefined sequence of characters;
   means for comparing said decoded characters and said information as to the relative positioning of said decoded characters with information defining said desired character string, whereby the presence of said desired character string is determined; and
   means responsive to said means for comparing for providing a signal indicating that said desired character string has been located.

2. The structure as in claim 1 wherein said means for decoding comprises a plurality of programmable latches for storing information defining said desired character string to be detected, means for comparing each received character with the information stored in said plurality of programmable latches, and means for providing an output signal indicating when the characters being received form said desired character string.

3. In a textual comparison system, a structure for detecting the presence of a plurality of delimiters within textual material formed from a predefined sequence of characters, comprising:
   means for sequentially receiving a plurality of stored characters,
   means for receiving a plurality of signals defining characters associated with said plurality delimiters to be detected;
   means for providing in response to the receipt of each of said plurality of stored characters, a selected one of a plurality of character output signals each uniquely associated with one of said plurality of textual characters; and
   means for comparing the relative positions of said plurality of character output signals, thereby providing an output signal corresponding to the detected delimiter when said relative positions of said plurality of character output signals defines one of said delimiters.

4. Structure as in claim 3 wherein said plurality of delimiters are selected from a group of delimiters consisting of END of WORD, END of SENTENCE, END of PARAGRAPH, END of CHAPTER, END of TITLE, and END OF DOCUMENT.

5. Structure as in claim 4 wherein an END of WORD delimiter is defined by the presence of a nonblank character followed by a blank character.

6. Structure as in claim 4 wherein an END of SENTENCE delimiter is defined by the presence of a period followed by two blank characters.

7. Structure as in claim 4 wherein an END of PARAGRAPH delimiter is defined by the presence of a period followed by three blank characters.

8. In a textual comparison system, set logic for combining a plurality of word signals indicating predefined words have been located between pairs of a predefined delimiter signal comprising:
 means for receiving said plurality of word signals;
 means for storing said plurality of word signals;
 means for receiving a plurality of delimiter signals;
 means for storing information defining which of said plurality of delimiter signals is said predefined delimiter signal;
 means for resetting said means for storing said plurality of word signals in response to said predefined delimiter signal;
 means for combining in a logical operation said word signals stored within said means for storing said plurality of word signals and providing a SET output signal; and
 means for masking from said means for combining selected output signals from said means for storing said plurality of word signals so as to cause these signal to have no effect on said SET output signal.

9. In a textual comparison system, set combination logic for combining a plurality of SET signals indicating when desired sets of characters have been detected, comprising:
 means for receiving a plurality of SET signals;
 means for storing said plurality of SET signals;
 means for combining in a logical operation said SET signals stored within said means for storing said plurality of SET signals and providing a SET combination output signal;
 means for masking from application to said means for combining selected ones of said plurality of SET signals, thereby causing said selected ones of said plurality of SET signals from having no effect on said SET combination output signal.

10. In a textual comparison system, proximity logic for detecting when a first selected word or set of words is located within a selected proximity of N delimiter characters from a second selected word or set of words, comprising:
 means for receiving a plurality of signals indicating when selected words or sets of words have been detected from within textual material formed from a predefined sequence of characters;
 means for selecting from said plurality of signals a first selected signal and a second selected signal;
 means for receiving a delimiter character;
 means for storing the relative positions of the characters within said textual material defined by said first and second selected signals and providing relative position signals;
 means for storing masking information;
 mean for combining signals indicating the relative position of said first and second selected signals;
 means for masking selected ones of said relative position signals in response to said masking information; and
 means for providing an output signal when said first and second selected word is located within said selected proximity.

11. Structure as in claim 10 wherein said proximity logic further comprises:
 means for receiving a plurality of types of delimiter signals; and means for storing information indicating which
 of said plurality of types of delimiter signals are of interest.

* * * * *